United States Patent
Katagiri

[19]

[11] Patent Number: 6,106,164
[45] Date of Patent: Aug. 22, 2000

[54] TRANSMISSION DEVICE OF DRIVING-FORCE FOR CAMERA

[75] Inventor: Moriya Katagiri, Tokyo, Japan

[73] Assignee: Olympus Optical Co., Ltd., Tokyo

[21] Appl. No.: 09/192,661

[22] Filed: Nov. 16, 1998

[30] Foreign Application Priority Data

Nov. 17, 1997 [JP] Japan ................................. 9-315483

[51] Int. Cl.$^7$ ............................... G03B 1/00; F16D 3/00; F16C 3/00
[52] U.S. Cl. .......................... 396/413; 464/106; 464/179
[58] Field of Search .................................. 396/144, 133, 396/71, 529, 418, 413, 411, 342, 453; 464/182, 106, 179

[56] References Cited

U.S. PATENT DOCUMENTS

| | | | |
|---|---|---|---|
| 1,201,562 | 10/1916 | Cooper | 464/106 |
| 2,354,184 | 7/1944 | Daniel | 464/106 |
| 3,557,678 | 1/1971 | Bellows | 396/453 |
| 4,034,574 | 7/1977 | Kuder | 464/106 |
| 4,229,094 | 10/1980 | Baab et al. | 396/324 |
| 5,610,677 | 3/1997 | Katagiri | 396/418 |

FOREIGN PATENT DOCUMENTS

| | | |
|---|---|---|
| 06347876 | 12/1994 | Japan . |
| 08304894 | 11/1996 | Japan . |

*Primary Examiner*—W.B. Perkey
*Attorney, Agent, or Firm*—Louis Weinstein

[57] ABSTRACT

A transmission device of driving-force for transmitting driving-force of various types of driving sources inside a camera. In order to provide the transmission device of driving-force that can contribute to downsizing of a camera without decreasing a transmission efficiency of the driving-force and affecting arrangement of mechanism members inside the camera, there is provided an input member inputting turning-force, an output member that is arranged so that its rotation center may be different from the rotation center of the input member, and a drive shaft transmitting the turning-force from the input member to the output member. A junction of a drive shaft and at least either of the input member and output member is constructed so that the junction can rotate in one-piece with having different rotation centers and allowing mutual inclination by making it possible to mutually rock.

12 Claims, 14 Drawing Sheets

FIG.1

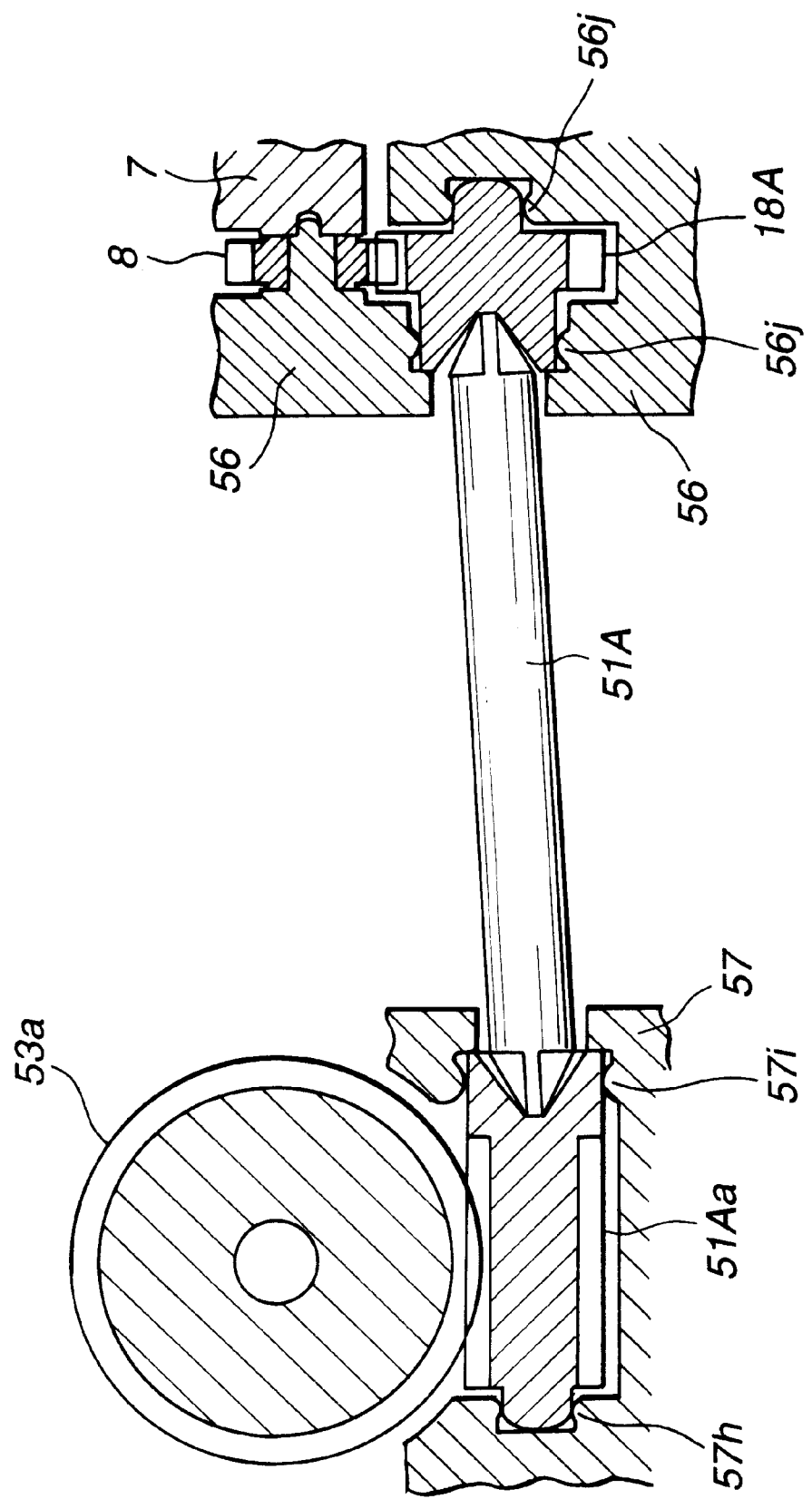

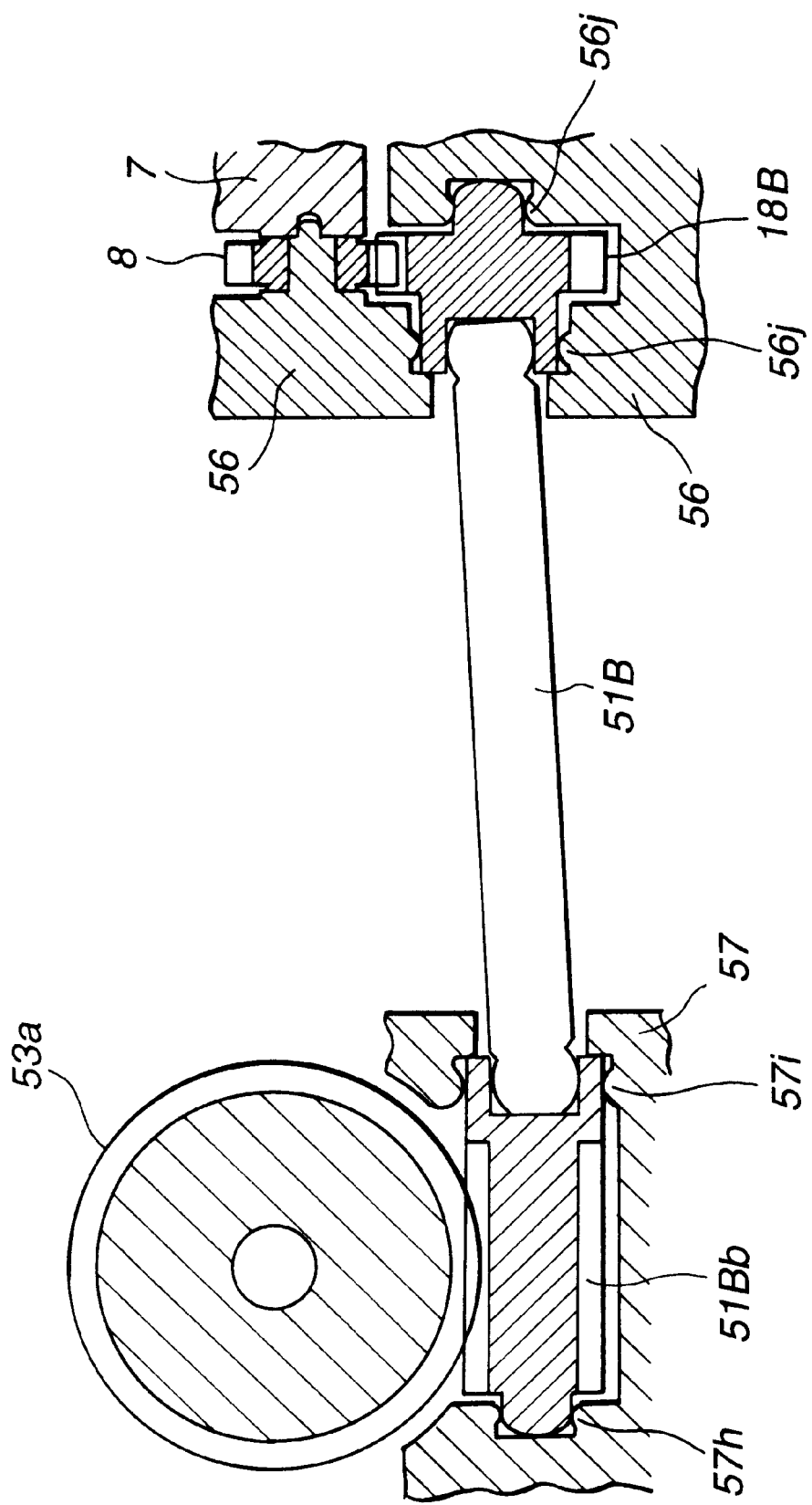

51B

51Ba

TRANSMISSION DEVICE OF DRIVING-FORCE FOR CAMERA

BACKGROUND OF THE INVENTION

1. Field of the Invention

The present invention relates to a transmission device of driving-force for a camera, and in particular, to a transmission device of driving-force for a camera that transmits the driving-force of a driving source to various types of drive mechanisms provided inside the camera.

2. Description of the Related Art

Up to now, in regard to a means for transmitting the driving-force from a driving source such as a motor to various types of drive mechanisms such as a film feed mechanism and a lens drive mechanism, various proposals such as what are disclosed in Japanese Unexamined Patent Publication No. 8-304894 and Japanese Unexamined Patent Publication No. 6-347876 are performed and put to practical use.

In a camera disclosed in the Japanese Unexamined Patent Publication No. 8-304894, a transmission device of driving-force transmits the driving-force of a driving source such as a motor to respective drive mechanisms so as to make the camera perform winding operation or rewinding operation of a roll of film provided inside the camera, zooming operation of a picture-taking lens barrel, and the like with an arrangement of a plurality of spur gears and using a clutch mechanism skillfully devised.

In addition, a feed mechanism of a camera disclosed in the Japanese Unexamined Patent Publication No. 6-347876 transmits the driving-force of a driving source such as a motor to various types of drive mechanisms such as a spool shaft, winding the film through a spur gear engaging with a worm gear, and a fork feeding the film from a cartridge and rewinding the film into a cartridge.

Nevertheless, in a transmission device of driving-force in the camera disclosed in the Japanese Unexamined Patent Publication No. 8-304894, a gear train composed of a plurality of spur gears is used as a transmitting means of the driving-force. Although transmission means of driving-force using this type of gear train have been commonly used up to now, these means have such a problem that the number of spur gears increases if the transmission distance at the time of transmitting the driving-force is long. Therefore, in this case, its transmission efficiency is apt to decrease.

In addition, as disclosed in the Japanese Unexamined Patent Publication No. 8-304894, if the driving-force is transmitted from a single driving source to a plurality of drive mechanisms by switching the driving-force, the number of spur gears further increases due to construction of a plurality of transmission systems. Therefore, if this type of transmission device of driving-force is adopted in a small device such as a camera, a space for containing many gears becomes necessary, and hence the device itself becomes large in consequence. In addition, if respective gears constructing the transmission means are undersized so as to avoid this, there arises a problem that the number of the spur gears furthermore increases, and hence the transmission efficiency of the driving-force becomes worse.

On the other hand, according to the means disclosed in the Japanese Unexamined Patent Publication No. 6-347876, worm gears (an input gear and an output gear), provided in both ends of a drive shaft having a shape of a long shaft, and a shaft part are constructed with the shaft in one-piece. A transmission means of driving-force that has such construction has such a problem that it becomes a factor of hindering downsizing of a camera itself to strictly achieve the state of mutually engaging with respective gears in the input side that input the driving-force and the state of mutually engaging with respective gears in the output side that output the driving-force, because arrangement of the drive shaft inside the camera is restricted.

SUMMARY OF THE INVENTION

An object of the present invention is to provide a transmission device of driving-force for a camera that can contribute to downsizing of a camera without decreasing a transmission efficiency of driving-force and affecting arrangement of mechanism members inside the camera.

In short, the present invention comprises an input member inputting turning-force, an output member that is arranged so that its rotation center may be different from the rotation center of the input member, and a drive shaft transmitting the turning-force from the input member to the output member. In addition, the present invention is further characterized in that a junction of the drive shaft and at least either of the input member and output member is constructed so that the junction can rotate in a one-piece manner although having different rotation centers and allowing mutual inclination by making it possible to mutually rock.

These and other objects and advantages of the present invention will be further apparent from the following description.

The present invention can provide a transmission device of driving-force for a camera that can contribute to downsizing of a camera without decreasing a transmission efficiency of driving-force and affecting arrangement of mechanism members inside the camera.

BRIEF DESCRIPTION OF THE DRAWINGS

FIG. 1 is an exploded perspective view of a camera body having a transmission device of driving-force that shows a first embodiment of the present invention;

FIG. 15 is a vertical cross-section of a main part showing a power transmission part that is a main part of a transmission device of driving-force for a camera that is a second embodiment of the present invention;

FIG. 18 is a vertical cross-section of a main part showing a power transmission part that is a main part of a transmission device of driving-force for a camera that is a third embodiment of the present invention;

DETAILED DESCRIPTION OF THE PREFERRED EMBODIMENTS

Figure 1:
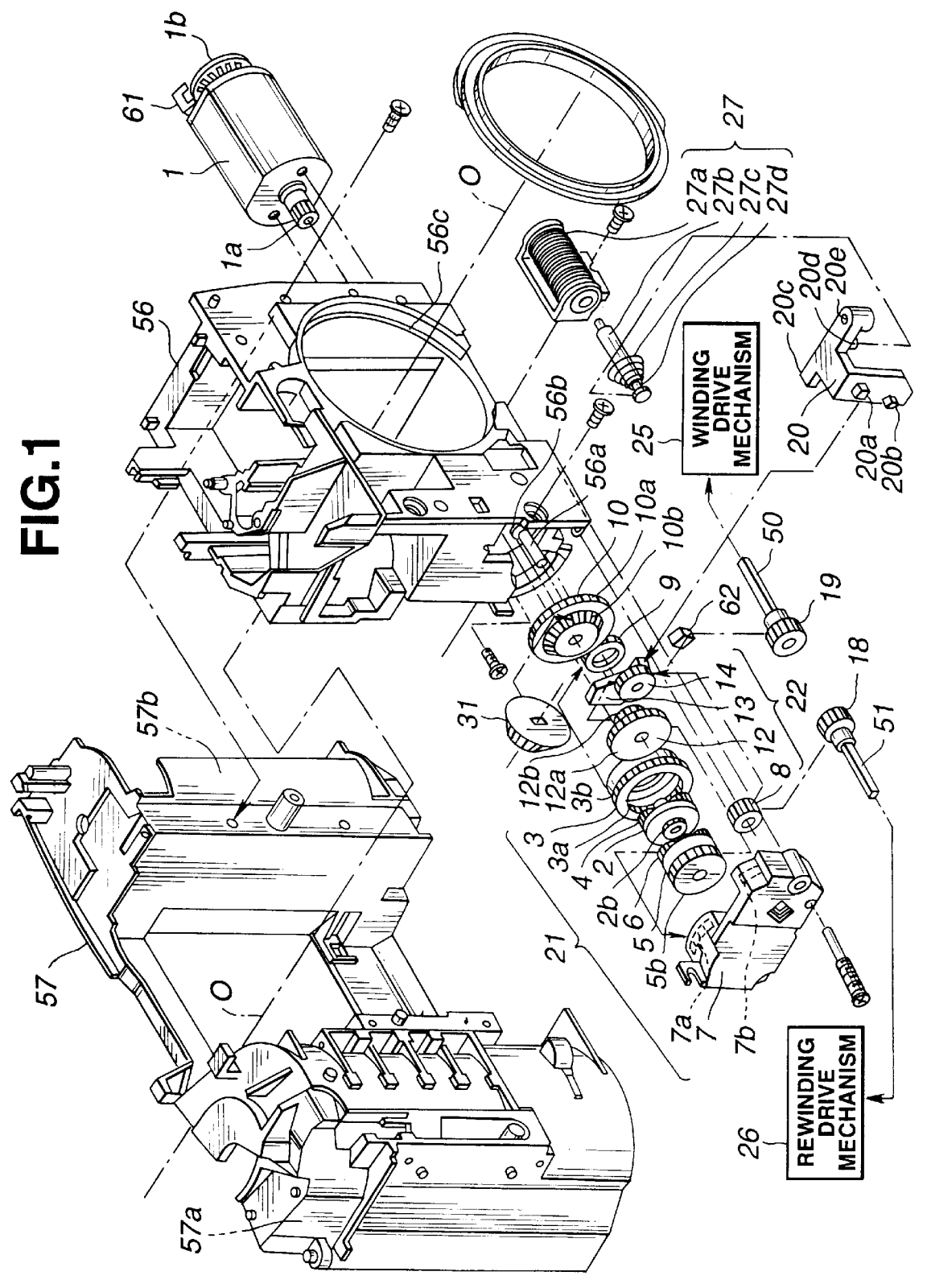
Figure 2:
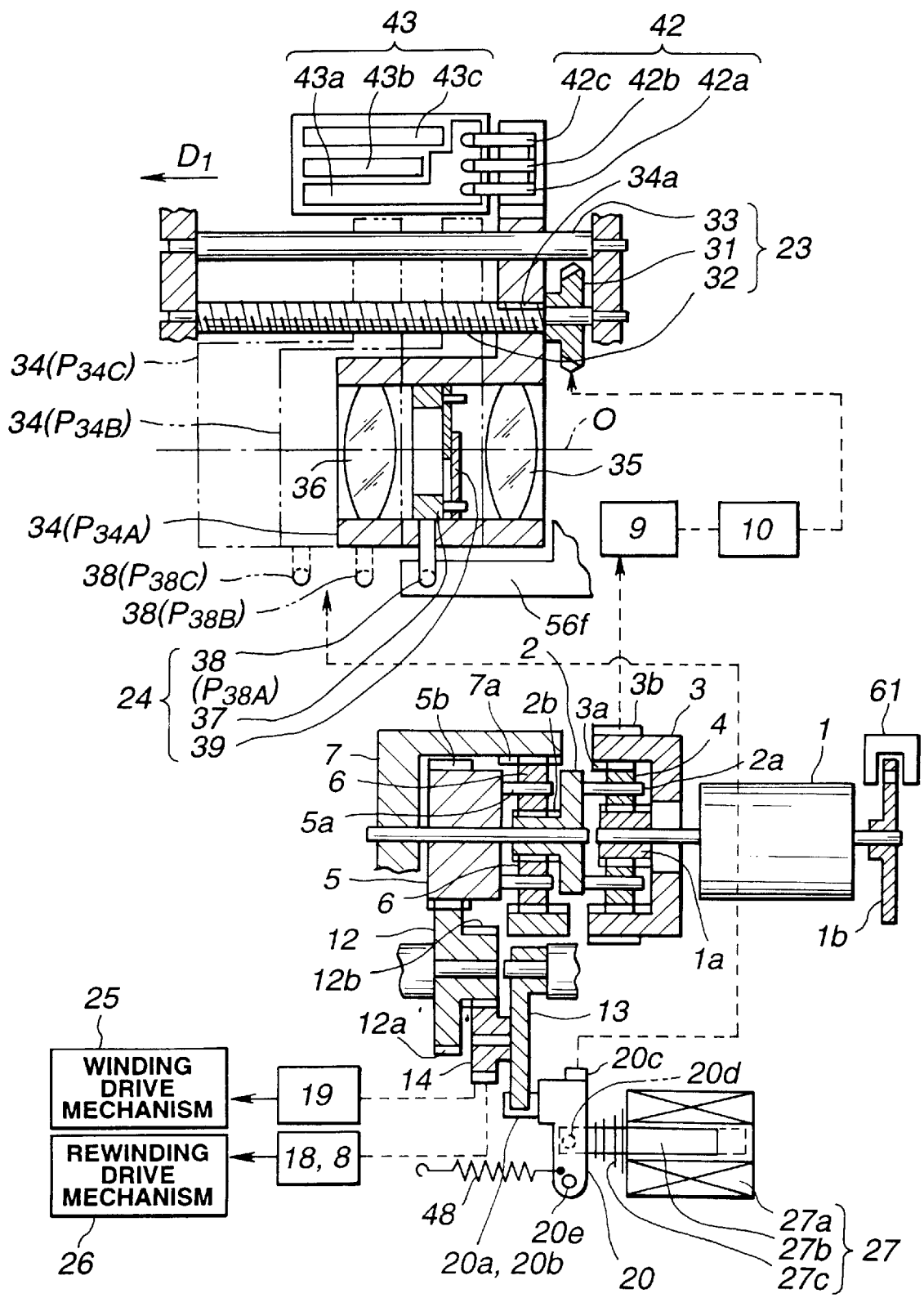
FIG. 2 is a vertical cross-section of the transmission device of driving-force for a camera in FIG. 1.
Figure 3:
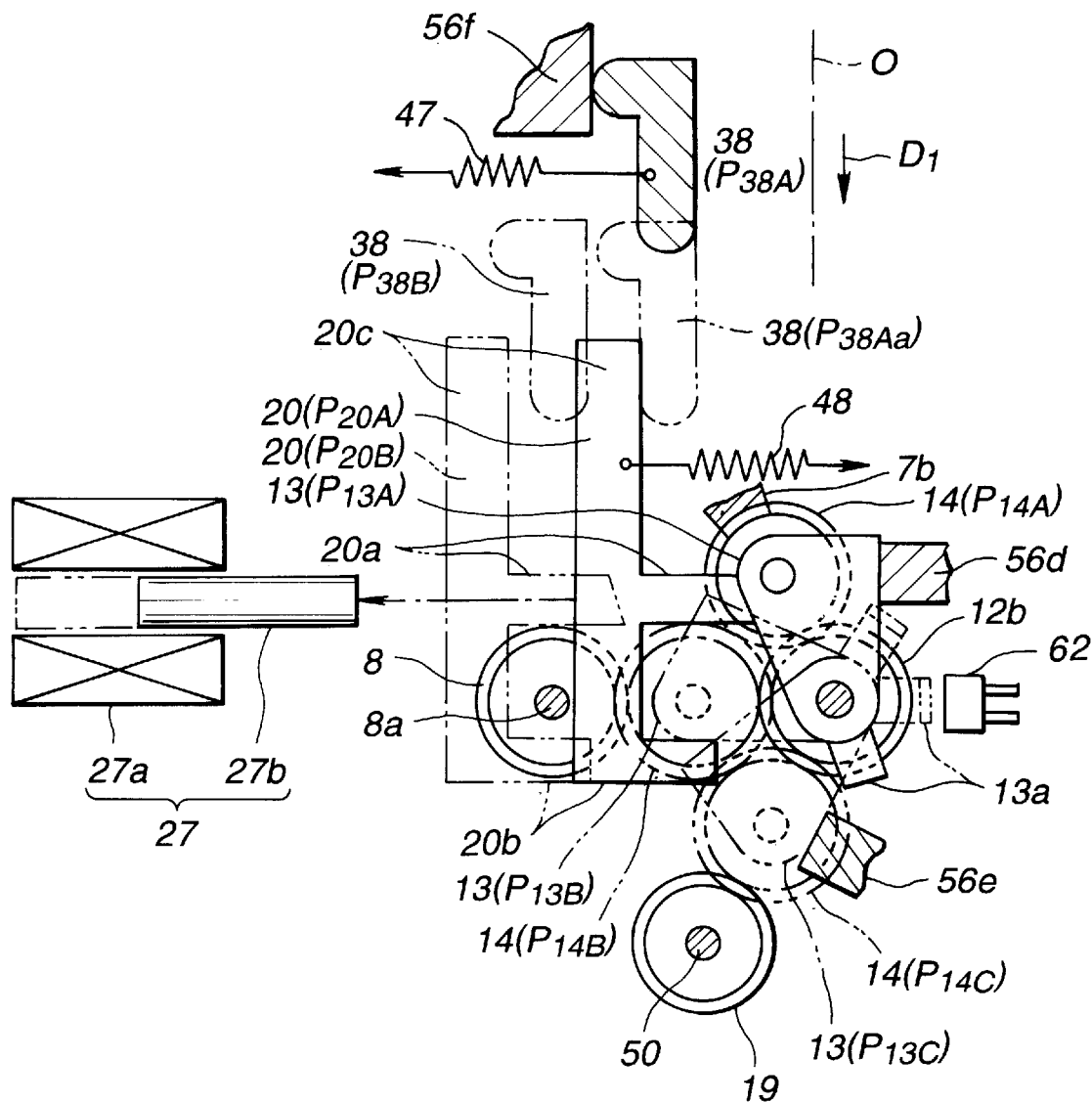
FIG. 3 is a cross-section of viewing members in the vicinity of planetary gears in the transmission device of driving-force for a camera from the direction of the shaft.
Figure 4:
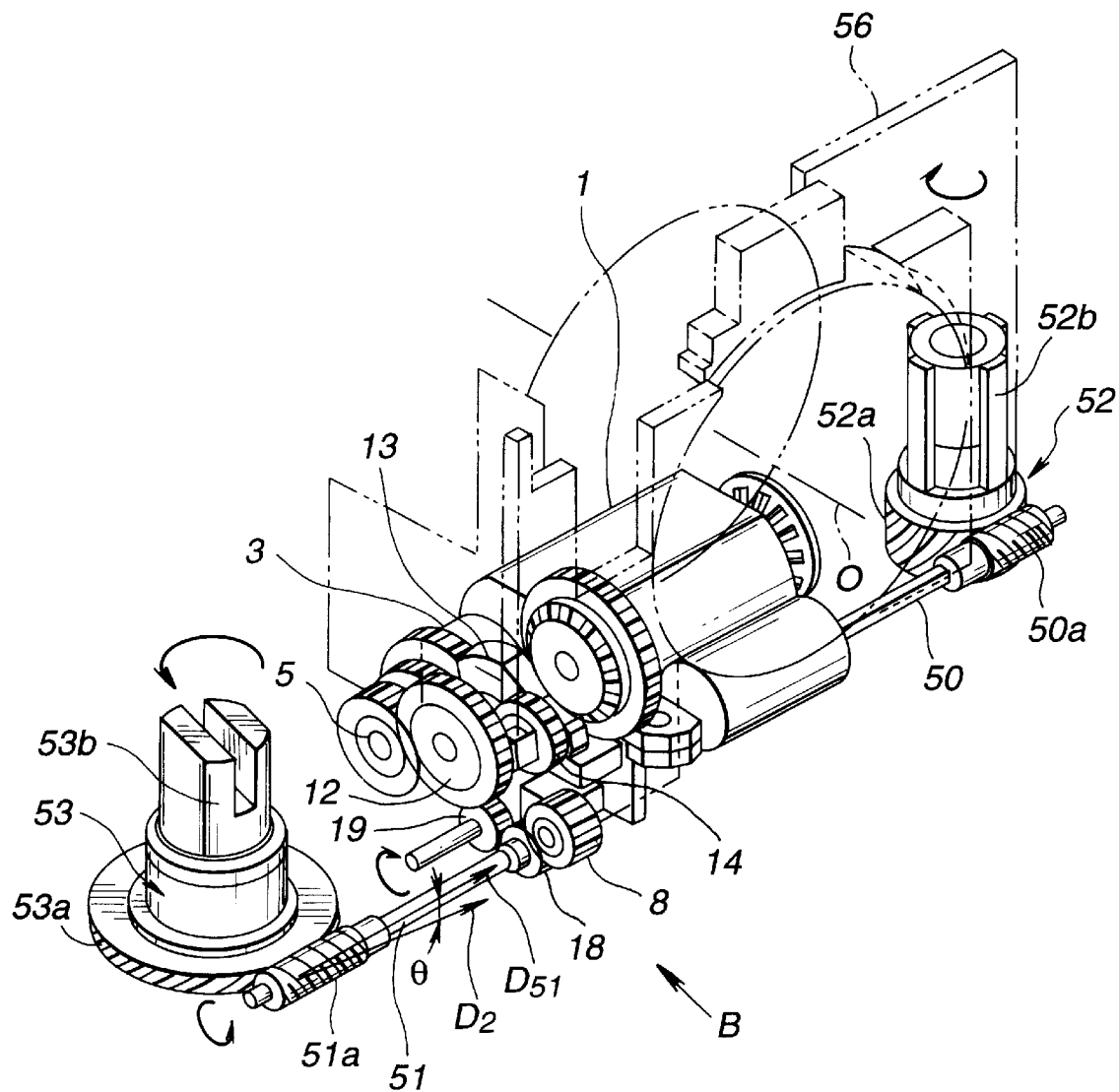
FIG. 4 is a perspective view showing respective operation states of members in the vicinity of a film feed mechanism part in the transmission device of driving-force for a camera in FIG. 1.
Figure 5:
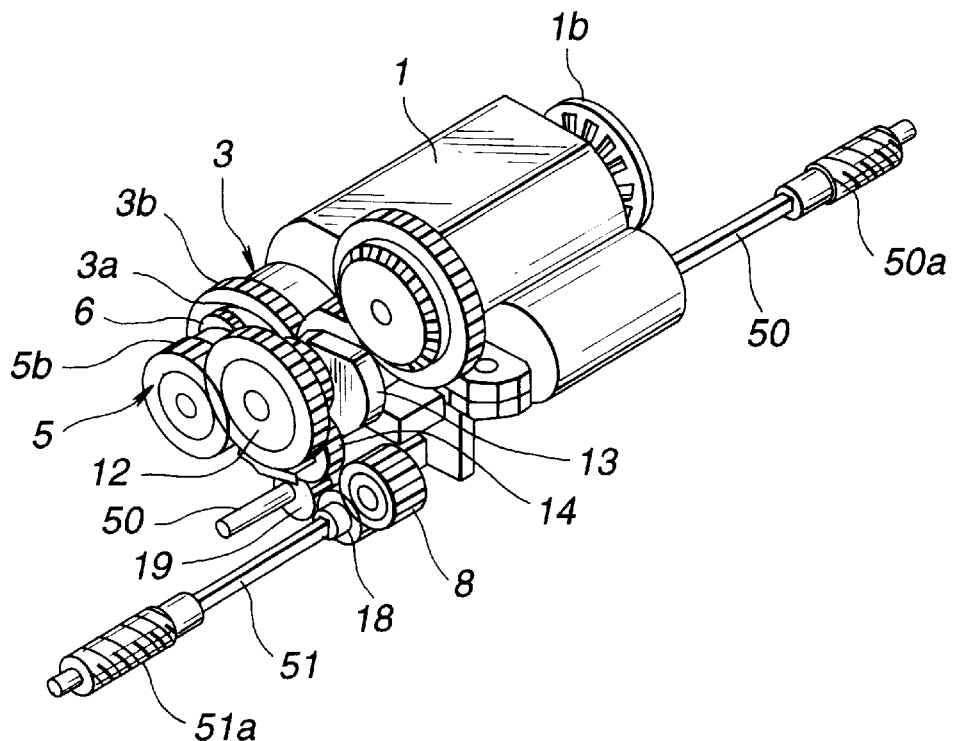
FIG. 5 is a perspective view showing respective operation states of members in the vicinity of the film feed mechanism part in the transmission device of driving-force for a camera in FIG. 1.
Figure 6:
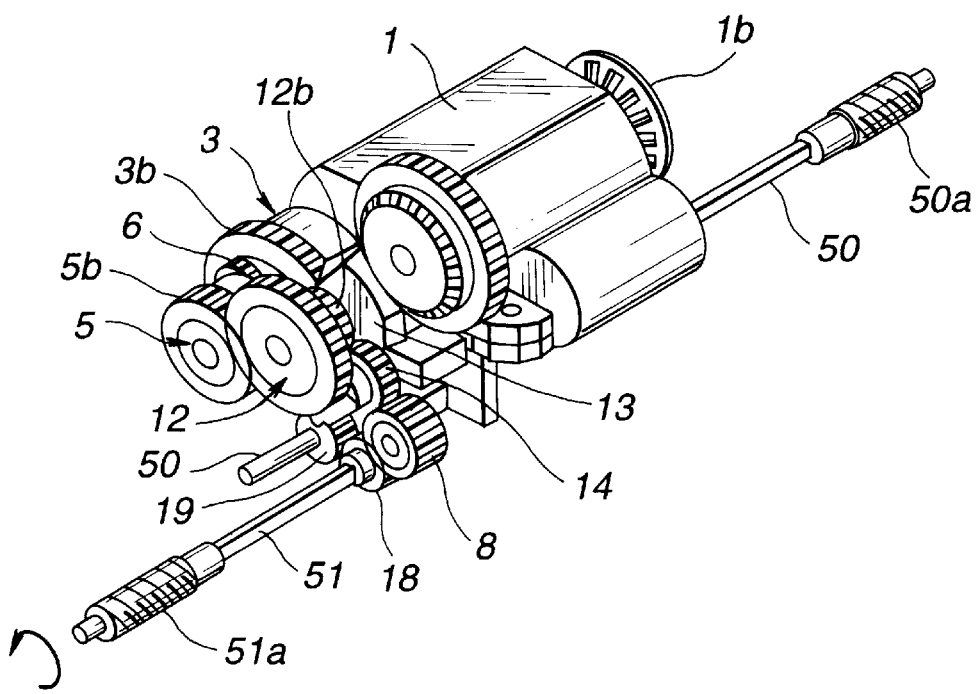
FIG. 6 is a perspective view showing respective operation states of members in the vicinity of the film feed mechanism part in the transmission device of driving-force for a camera in FIG. 1.
Figure 7:
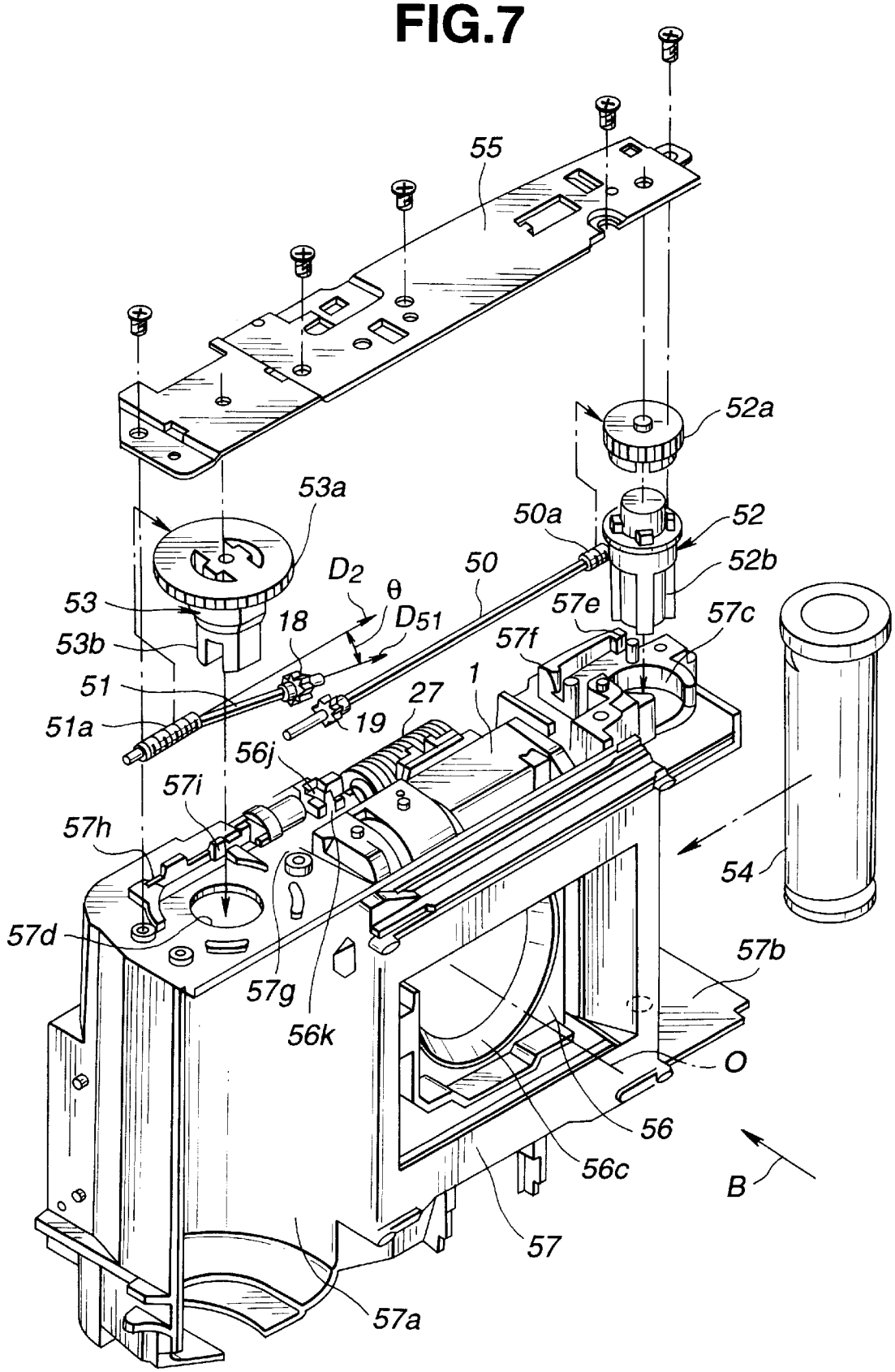
FIG. 7 is an exploded perspective view showing the film feed mechanism part in the transmission device of driving-force for a camera in FIG. 1 viewed from the bottom side of the camera body.

FIG. 1 shows an exploded perspective view of a camera body having a transmission device of driving-force for a camera that is a first embodiment of the present invention, and FIG. 2 shows a vertical cross-section of the transmission device of driving-force for a camera. In addition, FIG. 3 is a cross-section of viewing members in the vicinity of planetary gears in the transmission device of driving-force for a camera from the direction of the shaft. In addition, FIGS. 4 through 6 are perspective views showing respective operation states of members in the vicinity of a film feed mechanism part in the transmission device of driving-force for a camera. FIG. 7 is an exploded perspective view showing the film feed mechanism part in the transmission device of driving-force for a camera with viewing from the bottom side of the camera body. Furthermore, in FIGS. 4 through 6, an end plate that is a cover of the camera body and gear part is omitted due to simplification of drawings.

Figure 8:
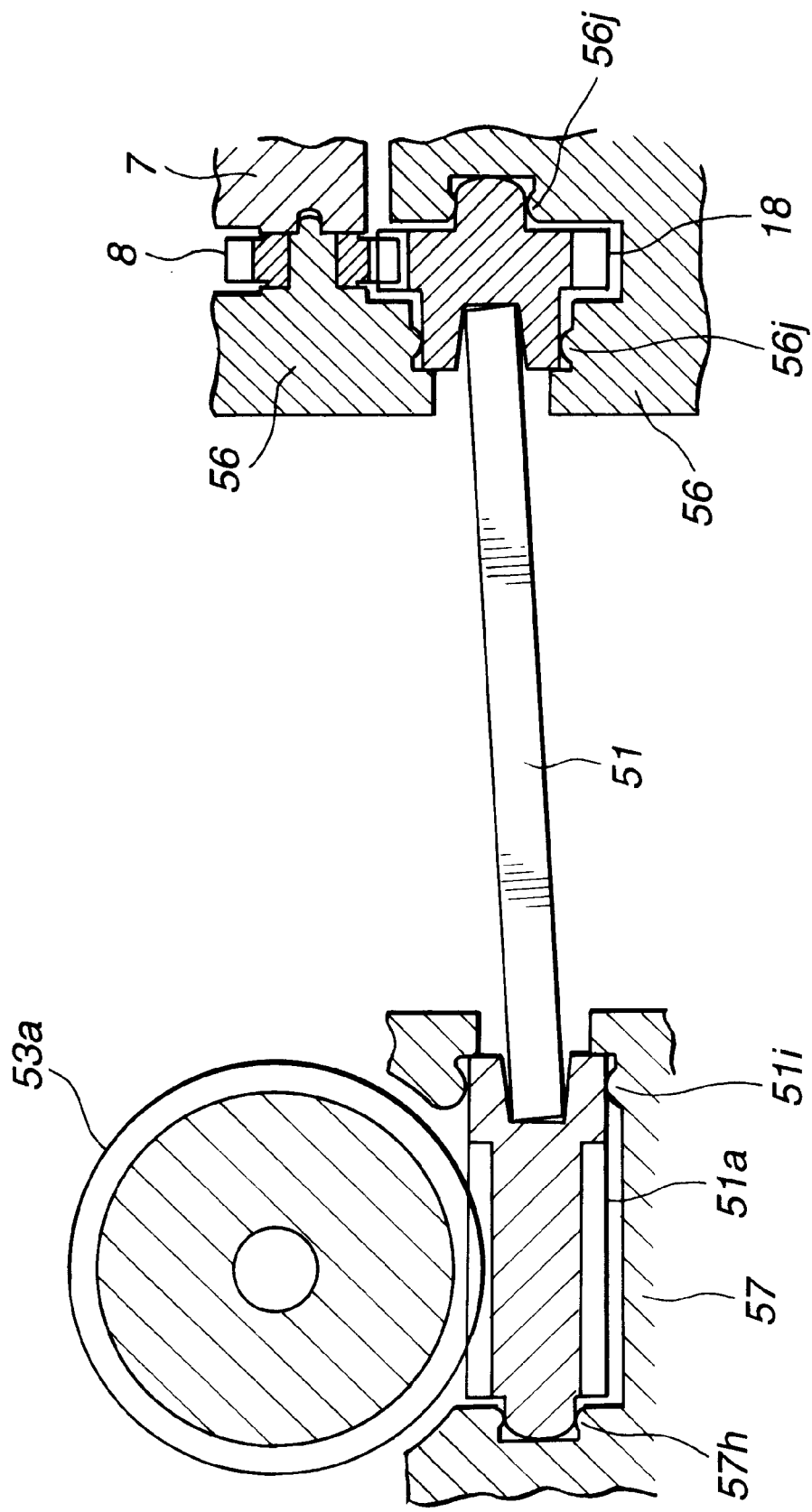
FIG. 8 is a vertical cross-section showing detail of a power transmission part that is a main part of the transmission device of driving-force for a camera in FIG. 1.
Figure 9:
FIG. 9 is an end elevation of viewing a junction of a rewinding shaft in the transmission device of driving-force for a camera in FIG. 1 from the direction of the shaft.
Figure 10:
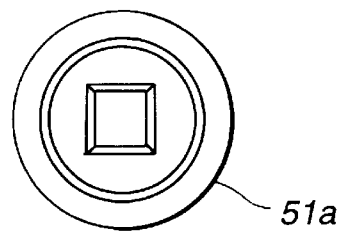
FIG. 10 is an end elevation of viewing a junction of a spur gear, which is an input member, and a screw gear, which is an output member, in the transmission device of driving-force for a camera from the direction of the shaft.

In addition, FIGS. 8 through 10 are detail drawings showing the transmission device of driving-force for a camera that is this embodiment, and FIG. 8 is a vertical cross-section of a power transmission part that is a main part of the transmission device of driving-force. FIG. 9 is an end elevation of viewing a junction of a rewinding shaft in the transmission device of driving-force from the direction of the shaft. Furthermore, FIG. 10 is an end elevation of viewing a junction of a spur gear, which is an input member, and a screw gear, which is an output member, in the transmission device of driving-force from the direction of the shaft.

The transmission device of driving-force for a camera that is this embodiment mainly comprises a motor part including a motor 1 that is a single driving source, a differential gear mechanism 21 that is driven by the motor 1 and has two output gears, a drive gear train and a lens barrel drive mechanism 23 (see FIG. 2) including an idle gear 9, as a first driven system driven by one of the output gears, and the like, a film feed mechanism that constructs the transmission device of driving force, is a second driven system driven by another of the output gears, and is composed of a film-winding drive mechanism 25 and a film-rewinding drive mechanism 26, a planetary gear mechanism 22 that is a planetary clutch mechanism selecting a driven system driven by the differential gear mechanism 21, a shutter mechanism 24 (see FIG. 2) as a third driven system that is different from the first driven system and second driven system, a plunger unit 27 that performs switching of transmission of the driving-force to the respective driven systems and driving of the third driven system and is an electromagnetic driving source, and a clutch lever 20 driven by this plunger unit 27.

A camera having the respective drive mechanisms therein, as shown in FIG. 1, comprises a camera body 57 having a film cartridge chamber 57a and a spool chamber 57b in opposite side edges thereof, and a front plate 56 that is mounted in the approximate center of this camera body 57 and has an opening part 56c for mounting the lens barrel.

In addition, the film feed mechanism part is provided in the bottom side of the camera body 57. Furthermore, the motor 1, a solenoid unit 27, and the like are provided in the bottom side of the front plate 56, and further the differential gear mechanism 21 and planetary gear mechanism 22 also are provided in the bottom side of the front plate 56. Moreover, a lens barrel 34, incorporating the shutter mechanism 24, and the lens barrel drive mechanism 23 are mounted in an opening part 56c of the front plate 56.

Here, construction of the respective elements will be described. First, the motor 1 that constructs the motor part and is a rotary drive source has output shafts projecting from both ends thereof, and a slit disk 1b, where holes transmitting light and surfaces cutting off light are continuously arranged, is fixed on one of the output shafts so as to control the rotation of the motor 1. A photo-interrupter 61, where a light-emitting element and a light-receiving element are arranged in a unit so that they may sandwich the slit disk 1b, is arranged. In addition, the photo-interrupter 61 outputs a pulse signal corresponding to a rotating angle of the motor.

Furthermore, a pinion gear 1a is fixed on another output shaft of the motor 1, and this pinion gear 1a engages with a plurality of gears comprising the differential gear mechanism 21, for example, three planetary gears 4.

The differential gear mechanism 21, as shown in FIGS. 1 and 2, is composed of two stages of planetary gear mechanisms, and comprises carriers 2 and 5 respectively having three planetary gears 4 and 6, an internal gear 3, and an end plate 7 that is fixed to the front plate 56, has an internal gear 7a and an internal sector gear 7b therein, and covers the gear mechanisms.

The planetary gears 4 are each rotatably supported by a plurality of shafts 2a provided in the carrier 2 having a rotating gear part 2b, and are freely rotatable with the shafts 2a as the center. In addition, the planetary gear 4 further engages internal teeth 3a of the internal gear 3 that is rotatable. This internal gear 3 has an external gear 3b as an output gear in the outer circumference thereof, and engages with a drive bevel gear 31 of the lens barrel drive mechanism 23 described later, through a gear train composed of a spur gear 10a and a bevel gear 10b that are supported by a shaft part 56a being eccentric to a shaft part 56b of the camera front-plate 56 of the camera and the idle gear 9 supported by the shaft part 56b.

In addition, the gear part 2b of the carrier 2 further engages with a plurality of gears of the carrier 5, for example, three planetary gears 6. These planetary gears 6 supported by a rotating shaft 5a provided in the carrier 5 that is similar to the carrier 2, and engages with an internal gear 7a within the end plate 7 fixed to the camera front-plate 56. The carrier 5 further has a gear part 5b as another output gear, and engages two stages of gear part 12a of the gear 12 through a gear train not shown to drive the planetary gear mechanism 22.

In addition, it is assumed that the shaft centers of the pinion gear 1a, internal gear 3, carrier 2, carrier 5, and internal gear 7a are arranged to be coaxial to the output shaft of the motor 1.

Furthermore, the output from the motor 1 can be outputted to two drive systems by means of the differential gear mechanism 21 which is switched by a clutch lever 20. One of these two drive outputs, as described above, becomes a drive output for the lens barrel drive mechanism 23 driving the lens barrel back and forth, and another drive output drives the planetary gear 14 of the planetary gear mechanism 22 to become a drive output for the film feed mechanism described later.

The lens barrel drive mechanism 23, as shown in FIG. 2, is a mechanism for advancing the lens barrel 34 supporting picture-taking lens groups 35 and 36 along an optical axis O from a tube-retracted position P34A, which is a non-picture-taking area, to a picture-takable position P34B, which is in a back-end part of a picture-taking area, and further driving the lens groups 35 and 36 back and forth between this picture-takable position P34B and a picture-takable position P34C, which is in the front-end part, for focusing. Furthermore, the mechanism 23 comprises the bevel gear 31 engaging with the bevel gear part 10b of the gear 10, a screw shaft 32 to which this bevel gear 31 is fixed in one-piece and which advances and retreats the lens barrel 34 along the optical axis O of the picture-taking lens groups 35 and 36, a guide shaft 33 that slidably fits with the lens barrel 34 and is arranged in parallel to the screw shaft 32, an internal screw 34a of the lens barrel 34 that is thread-connected with the screw shaft 32, and an encoder part (details of this part will be described later) detecting the advanced or retreat position of the lens barrel 34.

In addition, the lens barrel 34, as described above, holds the picture-taking lens groups 35 and 36, and also has the shutter mechanism 24 therein.

The shutter mechanism 24 comprises a vane wheel 37 that operates as a drive member where a rotary operation part 38 that is rotatable relative to the lens barrel 34 is mainly provided, a sector 39 that performs open/close operation of the shutter, that is, exposure and shield with rotating operation of this vane wheel, and a spring 47 (see FIG. 3) that operates as an energizing means energizing the sector 39 to the direction of opening the sector 39. Furthermore, a point of the rotary operation part 38 is rotatable from a shutter-closed position P38A (or P38Aa, see FIG. 3) to a shutter-opened position P38B.

Although the vane wheel 37 is advanced and retreated with the lens barrel 34, a stopper part 56f, as shown in FIGS. 2 and 3, is provided in the camera front plate 56 side as a restricting member for holding the rotary operation part 38 of the vane wheel 37 at the shutter-closed position P38A when the lens barrel 34 is at the tube-retracted position P34A. Furthermore, when the lens barrel 34 is advanced to the picture-taking area between the picture-takable positions P34B and P34C, the rotary operation part 38 of the vane wheel 37 moves to the position P38Aa and becomes in the state ready for opening to become in a state rotatable to the shutter-opened position P38B.

The encoder part 42, 43 is an encoder for detecting a position of the lens barrel 34 itself, and comprises an encoder board 43 that is provided in the camera body 57 and has encode patterns 43a, 43b, and 43c, and a sliding armature group 42 that can contact the patterns 43a, 43b, and 43c respectively. The sliding armature group 42 is composed of three armatures made of the same conductive members, and a first armature 42a always contacts the common pattern 43a electrically. Furthermore, a second armature 42b slidably contacts the detection pattern 43b of a count start position that detects a count start point of a output pulse signal of the photo-interrupter 61 so as to judge an advanced position when executing focusing of the lens barrel 34. Actually, a switching point of the pattern 43a and pattern 43b is detected. In addition, the third armature 42c slidably contacts the pattern 43c for detecting tube retraction so as to judge whether the lens barrel 34 is at the tube-retracted position against the camera. Actually, a switching point of the pattern 43a and pattern 43c is detected.

The planetary gear mechanism 22 are composed of a gear part 12a of the gear 12 engaging with the gear part of the carrier 5, a planetary gear arm 13 rotatably supported by a shaft of this gear 12, a planetary gear 14 that is rotatably supported by a shaft provided in this planetary gear arm 13 and engages with a sun gear part 12b, and the like.

Therefore, the planetary gear 14 rotates on its own axis, and also revolves with the gear 12 as the shaft center. On its revolution locus, the internal sector 7b that is inside the end plate 7 fixed to the camera front plate 56 and is used for fixing, a spur gear 8 that operates as a selected engaging-gear for film-rewinding drive, which is described later, and is pivoted by a supporting shaft 8a (see FIG. 3), and a spur gear 19 that operates as a selected engaging-gear for film winding and is pivoted by a winding shaft 50 (see FIGS. 2 and 3) described later. Furthermore, the planetary gear 14 can be engaged with the gears 7b, 8, and 19 respectively by stopping the planetary gear arm 13 at rotary positions P13A, P13B, and P13C that are shown in FIG. 3. Selection of rotary positions of the planetary gear arm 13 is performed by means of moving positions of the clutch lever 20 controlled by the plunger unit 27 described later.

In addition, as shown in FIG. 3, a reflector 13a for reflecting light is provided at the end of the planetary gear arm 13 opposite to the end where the planetary gear 14 is provided. Furthermore, a photo-reflector 62 (see also FIG. 2) for the clutch is arranged at the position P13B at which the planetary gear 14 and spur gear 8 engage with each other and which is a position facing to the reflector 13a.

The plunger unit 27, as shown in FIGS. 1 through 3, comprises a solenoid 27a, a movable core 27b that can be respectively drawn in and projected by turning on/off the solenoid 27a, and a return spring 27c energizing the core 27b in the direction of projection.

Although the clutch lever 20 is shown in FIG. 3 in the state of moving in parallel, actually, the lever 20, as shown in FIG. 1, is rotatably supported at a supporting shaft hole 20e by a fixing member (not shown) of the camera, and is provided as a rotary member controlling a position of the planetary gear arm 13 by means of its rotation.

In addition, as shown in FIG. 1, an arm 20a and a arm 20b, which come and go vertically against a moving plane of the planetary gear arm 13, are provided on the clutch lever 20, and an arm 20c, which comes in and goes out between an engagement position and a release position against the rotary operation part 38 of the vane wheel 37 is further provided. Furthermore, on the clutch lever 20, a connecting pin 20d engaging with a groove 27d provided in the core 27b of the plunger unit 27 is provided, and the plunger unit 27 controls the position of the clutch lever 20.

Thus, when the solenoid 27a of the plunger unit 27 is turned off, the core 27b projects, the clutch lever 20 is at the engagement position P20A, and the arm part 20a pinches the planetary gear arm 13 at the position P13A, or the arm part 20b holds the planetary gear arm 13 at the position P13B. Furthermore, if the lens barrel 34 is between the picture-takable positions P34B and P34C (see FIG. 2) and the clutch lever 20 is at the engagement position P20A, the arm part 20c holds the rotary operation part 38 of the vane wheel 37 for opening and closing of the shutter at the shutter-closed position P38Aa.

Moreover, when the core 37b is drawn and the clutch lever 20 is retreated to the retreat position P20B, the planetary gear arm 13 free to rotate, and further the arm part 20c is retreated. Therefore, if the rotary operation part 38 of the vane wheel 37 for opening and closing of the shutter is at the position P38Aa, the arm 13 moves to the shutter-opened position P38B to perform exposure.

In addition, the clutch lever 20 is always energized by a closing spring 48, which is an energizing means, in the direction where the shutter mechanism 24 is closed, that is, the direction where the core 27b is projected. Thus, although the closing spring 48 and return spring 27c are different in embodiments, they substantially the same function. Therefore, it is essential only that either one of the closing spring 48 and return spring 27c is provided and functions.

The film rewinding drive mechanism 26, as shown in perspective views of FIGS. 4 through 6 and the exploded perspective view of FIG. 7, comprises the spur gear 8 that can engage with the planetary gear 14 of the planetary gear mechanism 22, a screw gear or a worm gear 51a that is an output member outputting the driving-force of the motor 1 to the film rewinding drive mechanism 26 and becomes a second rotary member, a spur gear 18 that is an input member inputting the driving-force of the motor 1 and becomes a second rotary member, a rewinding shaft 51 that is a long-shaft-shaped connecting-shaft and a drive shaft where both ends that become junctions whose cross-sections are regular squares so as to transmit the rotation of this gear 18 and the screw gear 51a are formed, and that is also a first rotary member, and a fork shaft 53 having a driven helical gear 53a engaging with the screw gear 51a and a fork part 53b engaging with a spool shaft of a film cartridge (not shown) loaded in the film cartridge chamber 57a. Furthermore, since the gear 18 and screw gear 51a are arranged so that the gears 18 and 51a may be at the optimum positions in regard to relation between mating gears which respective gears engage with, that is, the spur gear 19, which is an inputting member for inputting the driving-force of the motor 1 and becomes the second rotary member, and the driven helical gear 53a, respective gears are at eccentric positions. Furthermore, the fork shaft 53 is rotatably supported at the supporting shaft hole 57d (see FIG. 7) of the camera body 57, and extend, into the cartridge chamber 57a.

Although the rewinding shaft 51 becomes the first rotary member, if the screw gear or worm gear 51a and the spur gear 18, as described above, are made to be the second rotary members, besides this, the rewinding shaft becomes the second rotary member if the screw gear or worm gear 51a and the spur gear 18 are made to be the first rotary members.

The film winding drive mechanism 25 (FIG. 1), as shown in detail in the perspective views of FIGS. 4 through 6 and the exploded perspective view of FIG. 7, comprises the spur gear 19 that is a second rotary member with which the planetary gear 14 of the planetary gear mechanism 22 can engage, a screw gear or a worm gear 50a that is an output member outputting the driving-force of the motor 1 to the film winding drive mechanism 25 and becomes a second rotary member, a winding shaft 50 that is a long-shaft-shaped connecting-shaft and a drive shaft where both ends that become junctions whose cross-sections are regular squares so as to transmit the rotation of the spur gear 19 and the screw gear 50a are formed, and that is also a first rotary member, a driven helical gear 52a engaging with the screw gear 50a, and a spool shaft 52 that is provided in the spool chamber 57b and has a fitting part 52b with a spool tube 54 (see FIG. 7) for winding the film. Furthermore, since the spur gear 19 and screw gear 50a are arranged so that the gears 19 and 50a may be at the optimum positions in regard to relation between mating gears which respective gears engage with, that is, the spur gear 18, planetary gear 14, and the driven helical gear 52a, respective gears are at eccentric positions. Furthermore, the spool shaft 52 is rotatably supported at the supporting shaft hole 57c (see FIG. 7) of the camera body 57, and holds the spool tube 54.

Although the winding shaft 50 becomes the first rotary member if the screw gear or worm gear 50a and the spur gear 19, as described above, are made to be the second rotary members, besides this, the winding shaft 50 becomes the second rotary member if the screw gear or worm gear 50a and the spur gear 19 are made to be the first rotary members.

The spur gear 18, as shown in FIG. 7, is rotatably fit in a shaft-fitting part 56j of the front plate 56. In addition, the screw gear 51a is rotatably fit in a shaft-fitting part 57h and 57i that are provided in the lower side of the film cartridge chamber 57a. Furthermore, respective rotation centers of the spur gear 18 and screw gear 51a, as described above, are arranged to be eccentric in the vertical direction of the camera body.

In addition, opposite ends of the rewinding shaft 51 are fit in hole parts (FIGS. 8 through 10) that are provided at respective rotation centers of the spur gear 18 and screw gear 51a and are junctions having square shape. Owing to this, the spur gear 18 and screw gear 51a are rotatably connected. Thus, the hole parts as the junctions make it possible to transfer rotation in the state of a rotation axis (rotation center) of the rewinding shaft 51, which is the shaft member, and a rotation axis (rotation center) of the spur gear 18 or screw gear 51a, which is the rotary member, mutually intersecting. Here, it is assumed that the rotation axis is a geometrically central axis and is a rotation center of a rotating member (this assumption is also used in the following description).

Furthermore, since a junction of one end part of the rewinding shaft 51 and the spur gear 18 and a junction of another end part of the rewinding shaft 51 and the screw gear 51a, as described above, are arranged with being eccentric, a cone-shaped space allowing the inclination of the rewinding shaft 51 is provided in the fitting part of each junction. Therefore, owing to this space, the rewinding shaft 51 can smoothly rotate, and hence can transmit the driving-force without difficulty. Moreover, lubricant, for example, grease is applied to respective teeth surfaces, where the shaft fitting parts 56j, 57i, and 57h, screw gear 51a, and helical gear 53a engage with each other, so as to able to perform rotation smoothly.

On the other hand, the spur gear 19, as shown in FIG. 7, is rotatably fit with a fitting part 56k of the front plate 56. In addition, the screw gear 50a is rotatably fit with shaft fitting parts 57e and 57f that are provided in the lower part side of the spool chamber 57b. Furthermore, respective rotation centers of the spur gear 19 and screw gear 50a are arranged with being eccentric to each other in the vertical direction of the camera body.

In addition, both end parts of the winding shaft 50, similarly to the form of the rewinding shaft 51, are fit respectively in holes (not shown) of the spur gear 19 and screw gear 50a that have square shape. Owing to this, the spur gear 19 and screw gear 50a are rotatably connected. Thus, the hole parts as the junctions make it possible to transfer rotation in the state of a rotation axis (rotation center) of the winding shaft 50, which is the shaft member, and a rotation axis (rotation center) of the spur gear 19 or screw gear 50a, which is the rotary member, mutually intersecting.

Furthermore, since a junction of one end part of the winding shaft 50 and the spur gear 19 and a junction of another end part of the winding shaft 50 and the screw gear 50a, as described above, are arranged with being eccentric, a cone-shaped space allowing the inclination of the winding shaft 50, similar to the form of the junction of the rewinding shaft 51, spur gear 18, and screw gear 51a, is provided in the fitting part of each junction. At the same time, lubricant, for example, grease is applied to respective teeth surfaces, where the shaft fitting parts 56k, 57e, and 57f, screw gear 50a, and helical gear 53a engage with each other. Therefore, owing to this, the winding shaft 50 also can smoothly rotate.

In addition, the screw gears 50a and 51a, gears 18 and 19, and the like that fit with and are arranged at the respective fitting parts 57e, 57f, 57h, 57i, 56j, 56k, and the like are pressed by a blockade 55 that is attached to the camera body 57 with screws or the like and is made of metal. Therefore, the screw gears 50a and 51a, gears 18 and 19, and the like are rotatably supported against the camera body 57 or front plate 56. At the same time, the fork shaft 53 and spool shaft 52 also are pressed by the blockade 55, and hence are rotatably supported against the camera body 57.

In this manner, the spur gear 18, spur gear 19, and screw gears 50a and 51a are arranged so that their relative positions may become positions where they can optimally engage with respective mating-gears and spaces that respective gears occupy can be suppressed. Owing to this, without decreasing the transmission efficiency of the driving-force and permanency of respective members, it becomes possible to arrange members in a smaller occupied space, and hence the present invention contributes to downsizing of a camera.

Here, winding and rewinding operation of the film that is performed by driving the winding shaft 50 and rewinding shaft 51 will be simply described below with reference to FIGS. 5 and 6.

FIG. 5 shows the state of film-winding operation, that is, the state of the winding shaft 50 being driven. In this winding state, the screw gear 50a in the direction of a right-handed screw, as described later, rotates clockwise in FIGS. 4 and 5, and the helical gear 52a of the spool shaft 52 engaging with this rotates clockwise as shown in FIG. 4 to wind the film.

In this case, the screw gear 50a is energized by its own thrust in the upper right direction in FIG. 4. The upper right end part of the screw gear 50a in FIG. 4 is hemispherically formed (the same shape as the end of the screw gear 51a shown in FIG. 8), and contacts a vertically downwardly bent part of the blockade 55 that is not shown. Since this contact part is greased, rotational loss in the state of the thrust of the screw gear 50a acting is reduced to a minimum.

In addition, at the time of this winding operation, the fork shaft 53 receives a clockwise turning force through the film. Owing to this, the screw gear 51a in the rewind side is energized to move in the lower left direction in FIG. 4. The lower left end part of the screw gear 51a in FIG. 4 is hemispherically formed (see FIG. 8), and contacts an end part of the fitting part 57h (see also FIG. 7) of the camera body 57. Since this contact part is greased, rotational loss in the state of the thrust of the screw gear 51a acting is reduced to a minimum.

In addition, in the transmission device of driving-force of this embodiment, the helical gear 53a and rewinding screw gear 51a have simple construction, and always engage with each other. Nevertheless, generally speaking, it is difficult to efficiently rotate the screw gear 51a, which has a large torsion angle, by the helical gear 53a.

Then, in the transmission device of driving-force of this embodiment, as described above, by making the contact part of the screw gear 51a in the direction of the thrust perform point contact at its rotation center, the radius of an area that the torque affects is minimized. In addition, by applying the grease, a coefficient of friction is reduced and an effect of the thrust to a friction force in the rotational direction is reduced.

Furthermore, by making the torsion angle of the screw gear less than or equal to 70° and constructing the thrust contact part as described above, it becomes possible to smoothly rotate the screw gear from the helical gear side. On the other hand, in case the helical gear is driven from the screw gear side, its efficiency becomes maximum at the torsion angle of nearly 60°, and it becomes difficult to drive the helical gear at the torsion angle of 20° or smaller. Therefore, it is desirable to set the torsion angle of the screw gear in this type of construction at nearly 70°–45°.

Then, in this embodiment, by adopting a gear specification where the torsion angle of the screw gear 51a is defined as 70° or smaller, that is, each screw gear having the torsion angle of 65° as shown in Table 1, the thrust is decreased. Owing to this, even if the both of the screw gear 51a and helical gear 53a are kept to engage with each other, it becomes possible to smoothly rotate the screw gear 51a.

TABLE 1

|  | Screw gear 51a | Helical gear 53a |
| --- | --- | --- |
| Classification | Small gear | Large gear |
| Tool |  |  |
| Tooth profile | Full depth tooth | |
| Module | 0.3 | |
| Pressure angle | 20° | |
| No. of teeth | 2 | 43 |
| Shaft angle | 87.71° | |
| Torsion angle | 65° | 22.71° |
| Torsional direction | Right | |
| Reference pitch diameter | 1.42 | 13.98 |
| Addendum modification coefficient on plane of rotation | +0.4 | −0.25 |
| Amount of addendum modification | +0.12 | −0.75 |
| Center distance | 7.9 mm | |

TABLE 2

|  | Screw gear 50a | Helical gear 52a |
| --- | --- | --- |
| Classification Tool | Small gear | Large gear |
| Tooth profile | Full depth tooth | |
| Module | 0.3 | |
| Pressure angle | 20° | |
| No. of teeth | 2 | 24 |
| Shaft angle | 90° | |
| Torsion angle | 66° | 24° |
| Torsional direction | Right | |
| Reference pitch diameter | 1.475 | 7.881 |
| Addendum modification coefficient on plane of rotation | +0.5 | +0.2 |
| Amount of addendum modification | +0.15 | +0.06 |
| Center distance | 4.9 mm | |

Next, FIG. 6 shows the state of the rewinding shaft 51 being driven, that is, film rewinding operation. At the time of this rewinding operation, the spool shaft 52 receives the counterclockwise turning force through the film. Similarly to the above-described operation in the rewinding state, the upper right end part of the screw gear 50a in the winding side that is shown in FIG. 6 is hemispherically formed so as to smoothly rotate the screw gear 50a with the helical gear 52a, and the contact part is greased. In addition, the gear specification is as shown in Table 2, and the torsion angle is defined as 66°.

By adopting such construction, it becomes possible at the time of the rewinding operation to smoothly rotate the screw gear 50a with the helical gear 52a in the state of the screw gear 50a and helical gear 52a engaging with each other.

In a conventional transmission means of driving-force, for example, a transmission device of driving-force where spur gears are arranged in rows, a transmission efficiency becomes worse as the number of spur gears increases, and hence it is necessary to reduce the total number of component gears. Therefore, by enlarging a diameter of each gear, it becomes possible to reduce the total number of component gears. Nevertheless, in order to provide a plurality of power transmission systems with using mechanisms having such construction, a larger arrangement space becomes necessary, and hence this becomes a drag on downsizing of a camera.

Then, in the transmission device of driving-force of this embodiment, as shown in FIGS. 4 through 7, a plurality of power transmission means, that is, the winding shaft 50 and rewinding shaft 51 are provided in parallel to a space of the bottom side of the camera.

Owing to such construction, in comparison with conventional transmission means of driving-force, that is, means of transmitting the driving-force with a mechanism where spur gears are arranged in rows, this embodiment does not increase the number of component members regardless of a transmission distance of the driving-force. Therefore, this embodiment does not increase manufacturing cost and also does not degrade the transmission efficiency of the driving-force. Furthermore, it is possible to provide the transmission device of driving-force without difficulty and effectively using a smaller occupation space inside a camera whose power transmission systems are downsized.

Operation of the transmission device of driving-force for a camera that is constructed as described above and is this embodiment will be described below.

First, as for advancing and retreating operation of the lens barrel, by driving the motor 1 and rotating the sun gear part 12b of the gear 12 clockwise in FIG. 3, the planetary gear arm 13 rotates and contacts a stopper part 56d in the camera front plate 56 side. At his time, the planetary gear 14 reaches the position P14A where the gear 14 engages with the internal sector gear 7b provided in the end plate fixed to the camera body, and becomes in the state of stopping rotation. In this state, by moving the clutch lever 20 to the engagement position P20A (see FIG. 3) and rotating the pinion gear 1a of the motor 1 counterclockwise, the planetary gear 14 attempts to revolve counterclockwise in FIG. 3. Nevertheless, since the arm part 20a of the clutch lever 20 is in the revolution locus and contacts the planetary gear arm 13, the counterclockwise revolution of the planetary gear 14 is hindered.

In addition, since the gear 12 cannot rotate if the motor 1 is driven clockwise or counterclockwise in FIG. 1 in the above-described state, rotation of the carrier 5, rotation and revolution of the planetary gear 6, and further rotation of the carrier 2 become impossible, and hence the rotation of the pinion gear 1a of the motor 1 is transmitted from the planetary gear 4 to the internal gear 3. Therefore, since the motor 1 can rotate in both directions and the bevel gear 31 fixed to the screw shaft 32 can rotate in both directions, the lens barrel 34 is driven back and forth in the direction of the optical axis. In this manner, in the state shown in FIG. 3, only the lens barrel 34 is driven.

Next, operation of opening/closing of the shutter in the lens barrel will be described.

When the lens barrel 34 is at the tube-retracted position P34A, rotation of the rotary operation part 38 of the vane wheel 37, as shown in FIG. 3, is regulated by the stopper part 56f in the camera front plate 56 side, and hence the shutter-closed state is kept. At this time, the clutch lever 20 is at the engagement position P20A.

Then, by rotating the motor 1 clockwise with rotation of the planetary gear 14 being locked as shown in FIG. 3, the lens barrel 34 moves to the direction of the arrow D1 in FIGS. 2 and 3, the rotary operation part 38 of the vane wheel 37 also moves in the direction D1 in a one-piece manner, and hence the part 38 is released from the stopper part 56f. Nevertheless, although the rotary operation part 38 is always energized to the left direction in FIG. 3, that is, the shutter-opened direction by the spring 47 giving the driving-force for driving the shutter, the clutch lever 20 is at the engagement position P20A, and hence the energizing force of the closing spring 48 whose energizing force is larger that that of the spring 47 acts through the side surface of the arm part 20c to keep the shutter-closed state. This state is the state ready for opening the shutter where exposure is started immediately if the clutch lever 20 is retreated.

Since the clutch lever 20 is retreated to the retreat position P20B if the solenoid 27a is activated in this state ready for opening the shutter, the rotary operation part 38 is released from the contact state and moves to the position P38B with the energizing force of the spring 47. The vane wheel 37 rotates in the shutter-opened direction by movement of this rotary operation part 38, the sector 39 becomes in the opened state, and exposure is performed. In order to make the shutter opened after that, the clutch lever 20 is returned to the engagement position P20A with the energizing force of the returning spring 27c or closing spring 48 by deactivating the solenoid 27a. Furthermore, since the arm part 20c presses the rotary operation part 38, the vane wheel 37 rotates in the shutter-closed direction to return in the shutter-closed state.

Next, operation of film feed drive will be described.

If the motor 1 is driven so that the gear 12 may rotate counterclockwise from the state in FIG. 3, the planetary gear 14 cannot revolve since the clutch lever 20 is always energized in the right direction in FIG. 3 by the closing spring 48 that is an energizing means. In addition, FIG. 4 shows a perspective view of the differential gear mechanism and film feed mechanism in the state of FIG. 3. Thus, the planetary gear 14 keeps the state of engaging with the internal gear 7*b* of the end plate 7.

Since the movable core 27*b* of the plunger unit 27 is connected to the clutch lever 20, the movable core 27*b* is drawn when a current passes the solenoid 27*a*, and the clutch lever 20 moves from the engagement position P20A to the retreat position P20B in the left direction in FIG. 3.

When the clutch lever 20 moves to the retreat position P20B and retreats from the revolution locus of the planetary gear 14, the planetary gear arm 13 becomes free from interference of arm parts 20*a* and 20*b* of the clutch lever 20. Then, by activating the solenoid 27*a* and rotating the sun gear part 12*b* of the gear 12 counterclockwise in FIG. 3 to the position P13C where the planetary gear arm 13 contacts the stopper part 56*e* in the camera front plate 56 side, the planetary gear 14 engages with the spur gear 19 of the winding shaft 50 of the film winding drive mechanism 25. In addition, FIG. 5 shows a perspective view of the film feed mechanism of the differential gear mechanism in the state of the planetary gear 14 engaging with the spur gear 19 of the winding shaft 50.

If the sun gear part 12*b* continues to rotate counterclockwise in the state of the planetary gear arm 13 being at the position P13C, the spur gear 19 also continues to rotate counterclockwise, drives the helical gear 52*a* through the screw gear 50*a* of the winding shaft 50, and rotates the spool shaft 52 to perform the film winding operation.

Although the turning force acts on the fork shaft 53 through the film during the above winding operation, as described above, the screw gear 51*a* engaging with the helical gear 53*a* is smoothly driven by the helical gear 53*a*, and hence the winding operation is performed without difficulty.

In addition, in order to perform the film rewinding operation, it is necessary for the gear 14 to engage the spur gear 8 after releasing the gear 14 from the state of engaging the arm 20*a* of the clutch lever 20.

Then, in order to engage the gear 14 with the spur gear 8, the sun gear part 12*b* of the gear 12 is rotated counterclockwise as shown in FIG. 3 and to revolve the gear 14 toward the spur gear 8 with drawing the movable core 27*b* by once activating the solenoid 27*a* and retreating the clutch lever 20 from the revolution locus of the gear 14. By deactivating the solenoid 27*a* when the gear 14 approaches the spur gear 8, the arm part 20*b* of the clutch lever 20 enters into the revolution locus of the gear 14 and contacts the planetary gear arm 13, the arm 13 is held at the position P13B, and hence the gear 14 is located at the position P14B and its revolution is hindered.

When the planetary gear arm 13 is at the position P13B, the planetary gear 14 engages with the spur gear 8, and hence the driving-force of the motor 1 is transferred from the sun gear part 12*b* of the gear 12 to the planetary gear 14, the spur gear 8, and the spur gear 18 of the rewinding shaft 51 if the sun gear part 12*b* is continuously rotated. In addition, in this case, the spur gear 8 is rotationally driven only in the counterclockwise direction in FIG. 3.

Furthermore, the helical gear 53*a* rotates through the screw gear 51*a*, and the fork shaft is driven for film rewinding operation to be performed.

Although the turning force acts on the spool shaft 52 through the film during the above rewinding operation, as described above, the screw gear 50*a* engaging with the helical gear 52*a* is smoothly driven by the helical gear 52*a*, and hence the rewinding operation is performed without difficulty.

Figure 11:
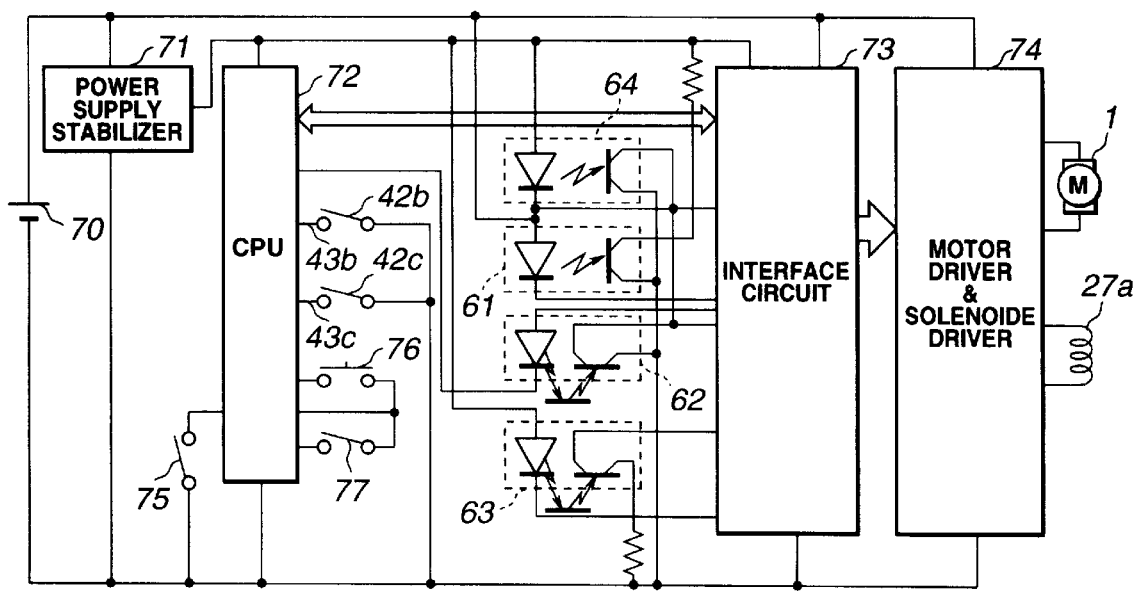
FIG. 11 is a circuit diagram of an electric controller in a camera comprising the transmission device of driving-force for a camera in FIG. 1.

Next, an electric controller of a camera comprising the transmission device of driving-force that is this embodiment will be described with reference to the electric controller diagram of FIG. 11.

The electric controller comprises a driving power supply battery 70 mainly used for the camera, a power supply stabilizer 71 for stabilizing a power supply, a CPU 72 performing control operation of the camera, an interface circuit 73 transferring signals between various types of controllers, control elements and the CPU 72, a driver 74 for driving the motor 1 and the solenoid 27*a* of the plunger unit 27.

A main switch 75, a release switch 76 of the camera, and a rewind switch 77 are connected to the CPU 72, and further respective encode patterns 43*a*, 43*b*, and 43*c* of an encoder board 43 are also connected to the CPU 72.

In addition, terminals of light-emitting devices or terminals of light-receiving devices of photo-reflectors 62 and 63 and photo-interrupters 61 and 64 are connected to the CPU 72 through the interface circuit 73.

The photo-reflector 62 is a photo-reflector for the clutch and judges whether the planetary gear arm 13 is located at the rewind position P13B, and the CPU 72 detects that the planetary gear 14 engages with the spur gear 8 for rewinding, if this reflector 62 is turned on. In addition, the photo-interrupter 61 is a photo-interrupter for detecting motor rotation, detects the rotation state of the motor 1 by detecting the motion of a slit disk 1*b* rotating between its light-receiving device and light-emitting device, and controls the back-and-forth position of the lens barrel 34 by this result.

The photo-reflector 63 is a detecting device for detecting the perforation of the film, and, when the film is wound up, the number of perforation of the film is counted. In addition, the photo-interrupter 64 is provided inside the lens barrel 34, and detects the motion of the rotary operation part 38. Detecting the open state of the shutter by this interrupter 64 becoming in the ON state, the CPU 72 controls the time of the shutter by receiving this signal.

A picture-taking sequence of a camera including the operation of the electric controller constructed in this manner and the transmission device of driving-force for the camera that is this embodiment will be described with reference to flow charts of FIGS. 12 through 14, the circuit diagram of the electric controller of FIG. 11, and mechanism structural drawings of FIGS. 1 through 3. In addition, in the following description, it is assumed that a clockwise rotational direction is a normal rotational direction and a counterclockwise rotational direction is a reverse rotational direction.

Figure 12:
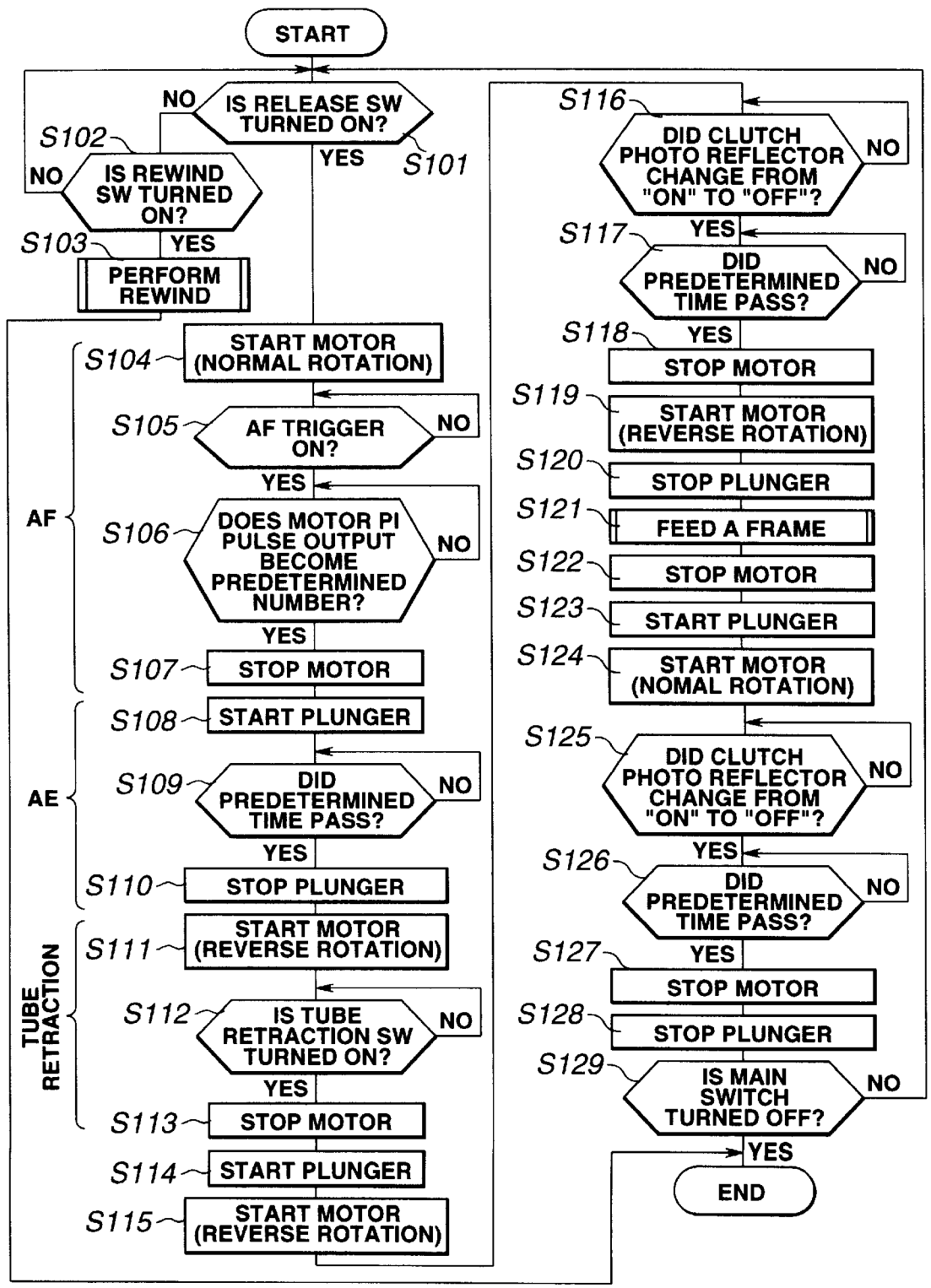
FIG. 12 is a flow chart of a picture-taking sequence including operation of the transmission device of driving-force for a camera in FIG. 1.

FIG. 12 shows a flow chart of a normal picture-taking sequence, and, first, if the main switch 75 is turned on, in a camera, the voltage of the battery 70 is supplied to respective components through the power supply stabilizer 71, and the CPU in the sleep state starts. Then, the CPU 72 confirms whether the release switch is turned on (step S101).

If the release switch is not turned on, the process jumps to step S102 and confirms whether the rewind switch 77 is turned on, and if the switch 77 is on, the rewind subroutine (step S103) of FIG. 13 that will be described later is executed for the picture-taking operation to be completed.

On the other hand, when the release switch 76 is turned on, automatic focusing control (AF operation) from steps S104 through S107 is performed. At step S104, if the motor 1 rotates in the one-way normal direction, the rotation of the motor 1 rotates the planetary gear 4 since the carrier 2 cannot rotate, owing to that, the internal gear 3 is rotated, in consequence, the screw shaft 32 is rotated, and the lens barrel 34 is advanced in the front direction of the optical axis.

After that, at step S105, the on-state of an AF trigger is checked. Thus, it is monitored whether the armature 42*b* that is always conductive to the ground electrically becomes conductive to the pattern 43*b*, and the process goes to step S106 if the armature 42*b* becomes conductive. This position of conductivity check becomes the trigger position for detecting the advanced position in the AF processing. Subsequently, the motor 1 continues to rotate, and the lens barrel 34 is further advanced.

At step S106, it is monitored whether pulses whose number is predetermined at the CPU 72 and starts from the trigger position are outputted from the photo-interrupter (PI) 61 for detection of motor rotation. When the detected pulse number coincides with the predetermined pulse number, it is judged that the lens barrel 34 reaches a predetermined position for focus adjustment, and the rotational drive of the motor 1 is stopped (step S107). The automatic focus adjustment (AF processing) is completed in this state. In the above completion state of automatic focus adjustment, the rotary operation part 38 of the vane wheel 37 is located at the position P38Aa that is the shutter-closed position in FIG. 3 since the rotary operation part 38 is located inside the lens barrel 34.

If the plunger unit 27 is turned on at step S108, that is, the solenoid 27*a* is activated, the movable core 27*b* is drawn, the clutch lever 20 moves to the retreat position P20B in the left direction as shown in FIG. 3 with resisting the energizing force of the closing spring 48, and the rotary operation part 38 moves to the shutter-opened position P38B in the left position in the drawing by means of the energizing force of the spring 47. Owing to this movement, the sector 39 is released, and hence the shutter becomes in the open state.

With interlocking with movement of the rotary operation part 38 at the time of this shutter-opened operation, the photo-interrupter 64 becomes ON, and time measurement for automatic exposure is triggered by detecting the shutter-opened state.

At step S109, it is monitored whether the shutter-opened time reaches the time predetermined at the CPU 72. The plunger unit 27 is turned off after the necessary shutter-opened time passed. Thus, the solenoid 27*a* is deactivated.

The clutch lever 20 returns to the engagement position P20A, which is the initial state in FIG. 3, owing to the deactivation of the solenoid, and the arm part 20*c* presses and moves the rotary operation part 38 of the vane wheel 37 to close the shutter. The automatic exposure processing (AE processing) is completed by means of processing from the step S108 to the step S110.

When the exposure processing to the film is completed, the camera retreats the lens barrel 34 to the tube retracted position P34A that is the initial position. Thus, if the motor 1 is rotated in the reverse direction different from the above-described drive direction at step S111, the lens barrel 34 retreats in the direction of the optical axis O since the carrier 2 does not similarly rotate. The ON state of the tube retraction switch is checked at step S112. Thus, it is monitored whether the armature 42*c* is changed from the pattern 43*c* to the OFF state, and if it is in the OFF state, it is judged that the lens barrel 34 reaches the tube-retracted position P34A, and the motor 1 is stopped at step S113 for the tube retraction processing to be completed.

It is necessary to wind up the exposed film after the above-described tube retraction processing. Then, the plunger unit 27 is turned on, that is, the solenoid 27*a* is activated at step S114, and the clutch lever 20 is retreated from the revolution locus of the planetary gear 14. The motor 1 is reversely rotated at step S115. Owing to this reverse rotation, the planetary gear 14 revolves counter-clockwise in FIG. 3 and engages with the spur gear 19 driving the film winding drive mechanism 25.

The internal gear 3 also attempts to drive the lens barrel 34 from the tube-retracted state to the deeper position along the optical axis O, that is, in the retreated position so as to rotate at the time of driving the planetary gear 14. Nevertheless, Since the lens barrel 34 is mechanically restricted in movement from the tube-retracted position to a further retreated position, the lens barrel 34 keeps the state of stopping at the tube-retracted position P34A. In consequence, the internal gear 3 stops rotation, the rotation of the motor 1 is transferred only to the carrier 5, and further, the carrier 3 revolutionarily drives the planetary gear 14 through the sun gear part 12*b* of the gear 12.

Although the planetary gear 14 engages with the spur gear 19 owing to the above-described revolutionary operation, the photo-reflector 62 for the clutch is made to detect whether the planetary gear arm 13 securely moves, so as to secure engagement of the gear 14 and spur gear 19. For the sake of that, it is monitored at step S116 that the reflector 13*a* of the planetary gear arm 13 passes the position facing to the photo-reflector 62, that is, that the photo-reflector 62 becomes from the ON state to the OFF state.

When it is detected at step S116 that the photo-reflector 62 becomes from the ON state to the OFF state, it is monitored at step S117 whether a certain predetermined time passes, so as to keep the rotation of the motor 1 for the certain time. When the certain time passes, the rotation of the motor 1 is once stopped at step S118.

The motor 1 is reversely rotated at step S119 to start the film winding operation with the gears 14 and 19 engaging. In addition, the solenoid 27*a* of the plunger is deactivated at step S120 to return the clutch lever 20 to the original engagement position P20A. A subroutine for feeding one frame of film is executed at step S121. When this one-frame feeding is completed, the motor 1 is stopped at step S122.

When the film winding process is completed, in order to return the camera to the initial state, the solenoid 27*a* of the plunger is activated at step S123 and the clutch lever 20 is retreated from the revolution locus of the gear 14 again. Furthermore, the motor 1 is rotated in the normal direction at step S124. At this time, although the internal gear 3 attempts to rotate, since the load of the driven system connected after the gear 12 is lighter than that of the lens barrel drive system, the lens barrel drive system is not driven owing to the action of the differential gear. Therefore, the driving-force of the motor 1 is transferred from the carrier 5 side to the gear 12.

When the sun gear part 12*b* of the gear 12 is driven in the clockwise direction by means of rotation of the carrier 5, the planetary gear 14 starts revolution and engages with the internal sector gear 7*b*, and at the same time, the planetary gear arm 13 contacts the stopper part 56*d*. During this time, so as to monitor whether this revolution is securely performed, it is detected whether the reflector 13*a* of the planetary gear arm 13 passes through the position facing the photo-reflector 62 for the clutch after facing the photo-reflector 62. Thus, it is monitored at step S125 whether the photo-reflector 62 changes from the ON state to the OFF state. When the photo-reflector 62 changes from the ON state to the OFF state, so as to securely engage the gear 14 with the sector gear 7b, it is monitored at step S126 whether the predetermined time passed. After passing of the predetermined time, the motor 1 is stopped at step S127.

After that, the solenoid 27a of the plunger is deactivated at step S128, the clutch lever 20 is returned to the original engagement position P20A, and the camera is returned to the initial state.

At step S129, it is monitored whether the main switch is turned off, and if it is turned off, the power supply of the camera is turned off. If not, the process jumps to the step S101 and the process waits the ON state of the release switch.

Next, a film rewinding processing will be described with the flow chart of FIG. 13.

Figure 13:
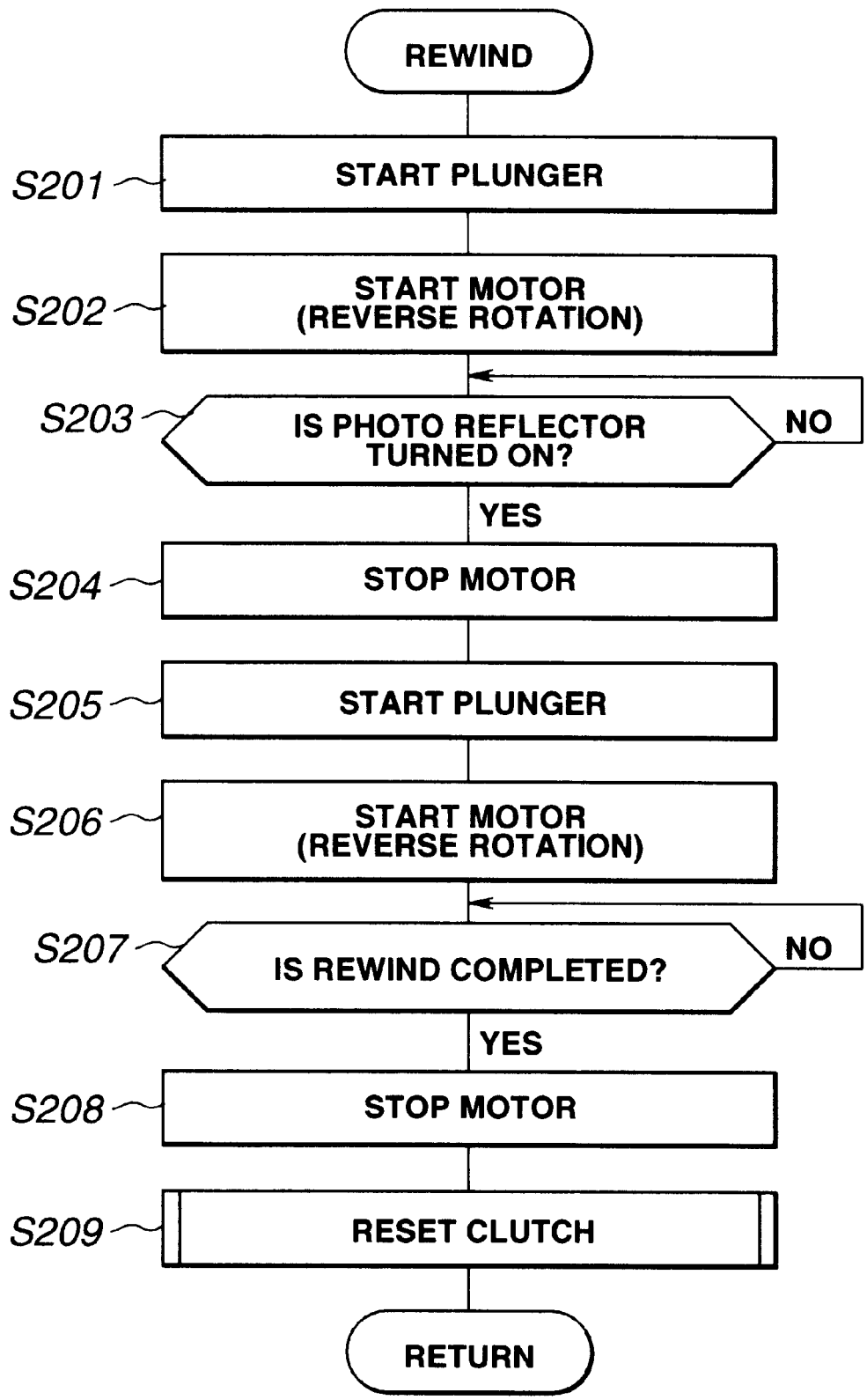
FIG. 13 is a flow chart of a subroutine for film rewinding processing in the camera of FIG. 1.
Figure 14:
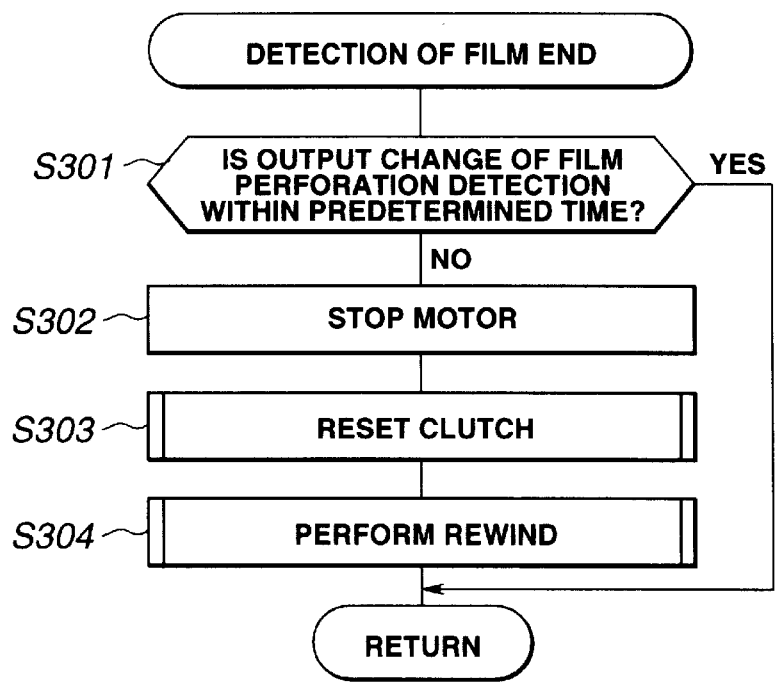
FIG. 14 is a flow chart of a subroutine for film end detection processing in the camera of FIG. 1.

When it is detected at the step S102 in the picture-taking sequence that the rewind switch 77 (see FIG. 11) is turned on, the subroutine of FIG. 13 is called to execute the film rewinding process.

Thus, the solenoid 27a of the plunger unit 27 is activated at step S201 to retreat the clutch lever 20 from the revolution locus of the planetary gear 14. By reversely rotating the motor 1 at step S202, the planetary gear 14 revolves counterclockwise. Then, when the reflector 13a of the planetary gear arm 13 reaches the position facing the photo-reflector 62, the photo-reflector 62 changes to the ON state. By monitoring this state at step S203, the motor 1 is stopped at step S204. At the same time, by deactivating the solenoid 27a of the plunger unit 27 at step S205, the clutch lever 20 is returned to the original engagement position P20A.

By returning of the clutch lever 20, the planetary gear arm 13 is located between the arm parts 20a and 20b of the clutch lever 20. By reversely rotating the motor 1 at step S206, the planetary gear arm 13 is located due to the counterclockwise revolution of the gear 14 at the position P13B where the arm 13 contacts the arm part 20b of the clutch lever 20. In this state, the planetary gear 14 becomes in the state of engaging with the spur gear 8 engaging with the spur gear 18 driving the film rewinding drive mechanism. Therefore, by keeping the motor rotating in this state, film rewinding is continued.

The CPU 72 monitors completion of the rewinding at step S207, and stops the motor 1 at step S208 when the rewinding is completed. After this, at step S209, the CPU executes clutch reset processing for resetting the planetary gear arm 13 so as to return the camera to the initial state. This clutch reset processing is the same as the process steps from the step S123 to the step S128 in the flow chart of FIG. 12. After this reset operation, the CPU 72 places the camera in the state, which is the same as the state at the time of the main switch 75 of the camera being turned off, and the picture-taking sequence of the camera is completed.

Next, film end detection processing, which is a subroutine and processing at the time when the film winding operation is stopped at some midpoint since a frame of winding cannot be performed during the film-winding processing, will be described with reference to the flow chart of FIG. 14. In addition, this processing is a subroutine included in the one-frame feed processing that is a subroutine called at the step S121 in FIG. 12.

At step S301, so as to observe whether the film is normally fed by detecting the perforation of the film, the output of the photo-reflector 63 is monitored. If a pulse output corresponding to perforation movement is not obtained within predetermined time, it is judged that the film reaches the film end or stops on the way of feeding. If the pulse output does not change within the predetermined time, the motor 1 is stopped at step S302.

After this, although the film is rewound, it is necessary to return the planetary gear arm 13 to the initial state. Hence, the operation, which is the same as the reset operation of the planetary gear arm 13 for returning the camera to the initial state at the step S209 in FIG. 13, that is, the operation, which is the same as the processing from the step S123 to the step S128 in FIG. 12, is executed in the clutch reset processing at step S303. Then, after the rewind processing subroutine in FIG. 13 is performed at step S304, the CPU 72 places the camera in the state, which is the same as the state at the time of the main switch 75 of the camera being turned off, and the picture-taking sequence of the camera is completed.

As described above, according to this embodiment, by applying a rod-shaped shaft member as a shaft on which a spur gear transmitting the driving-force is mounted and providing the shaft member in the inclined state, efficient arrangement becomes possible, and flexibility of the arrangement is secured.

Furthermore, by applying a drive mechanism, where a screw gear and a helical gear are combined, as a gear transmitting driving-force to a fork shaft engaging with a spool shaft or a cartridge shaft, winding and rewinding operation becomes executable without releasing the engaging state of the screw gear and helical gear that are the side driven by film at the time of winding operation or rewinding operation of the film. Owing to this, it becomes possible not only to securely transmit the driving-force with simpler construction, but also to make the space occupying the inside of a camera smaller. Therefore, it becomes possible to secure more flexibility of design of a camera itself where the device is provided, and to be able to contribute to downsizing and lightening of the camera and also to reduction of manufacturing cost.

In addition the, respective shapes of the junction of the spur gear 18 and screw gear 50a and the junction of the spur gear 19 and screw gear 51a are not limited to the aspects (see FIGS. 8 through 10) in the first embodiment, but another form as shown below is conceivable.

Figure 16:
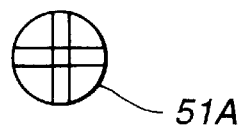
FIG. 16 is an end elevation of viewing a junction of a rewinding shaft in the transmission device of driving-force of FIG. 15 from the direction of the shaft.
Figure 17:
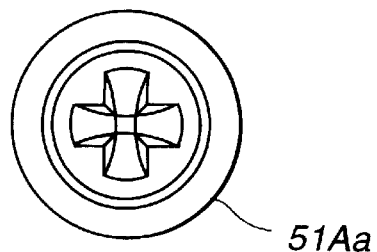
FIG. 17 is an end elevation of viewing a junction of a spur gear, which is an input member, and a screw gear, which is an output member, in the transmission device of driving-force of FIG. 15 from the direction of the shaft.

Thus, FIGS. 15 through 17 are detail drawings showing main parts in a transmission device of driving-force for a camera that is a second embodiment of the present invention. FIG. 15 shows a vertical cross-section of a main part of a power transmission part that is a main part of the transmission device of driving-force. In addition, FIG. 16 shows an end elevation of viewing a junction of the rewinding shaft in the transmission device of driving-force. In addition, FIG. 17 is an end elevation of viewing a junction of a spur gear, which is an input member, and a screw gear, which is an output member, in the transmission device of driving-force looking from the direction of the shaft toward the screw gear.

A rewinding shaft 51A in the transmission device of driving-force that is this embodiment is formed with a round rod having convex parts, having the shape of Phillips type screwdrivers (bit shape), at both ends thereof. In junctions connected to the shaft 51A, that is, junctions in a spur gear 18A side and a screw gear 51Aa side, grooves that each can receive the convex part, having the shape of Phillips type screwdriver are formed. For this purpose, in the grooves, conoidal spaces that allow the inclination of the rewinding shaft 51A are provided. By forming the junctions in this manner, the rewinding shaft 51A can smoothly rotate.

In addition, although, here, only the construction of the side of the rewinding shaft 51A transmitting the driving-force to the film rewinding drive mechanism 26 is shown and described, similar construction can be applied to the winding shaft 50 transmitting the driving-force to the film winding drive mechanism 25. In this case also, quite similar effects can be obtained.

Figure 19:
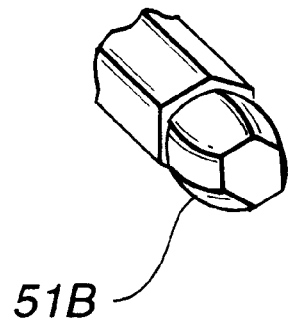
FIG. 19 is a perspective view of a main part showing a junction of a rewinding shaft in the transmission device of driving-force of FIG. 18.
Figure 20:
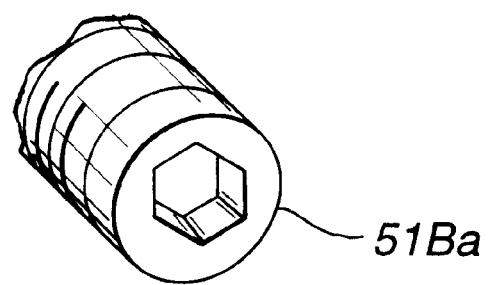
FIG. 20 is a perspective view of a main part showing a junction of a screw gear that is an output member in the transmission device of driving-force of FIG. 19.

Furthermore, FIGS. 18 through 20 are detail drawings showing main parts of transmission device of driving-force for a camera that is a third embodiment of the present invention. FIG. 18 shows a vertical cross-section of a main part showing a power transmission part that is a main part of the transmission device of driving-force. In addition, FIG. 19 is a perspective view of a main part showing a junction of a rewinding shaft in the transmission device of driving-force. Furthermore, FIG. 20 is a perspective view of a main part showing a junction of a screw gear that is an output member in the transmission device of driving-force.

A rewinding shaft 51B in the transmission device of driving-force that is this embodiment is a rod member having a hexagonal cylinder shape that is a multiple prismatic shape. opposite end parts of the shaft 51B are formed with convex parts having a shape of Allen wrenches that are formed in the shape of spheres having six surfaces.

In junctions connected to the shaft 51B, that is, junctions in a spur gear 18B side and a screw gear 51Ba side, hexagonal-shaped holes that each can receive in a free and easy manner the spherical convex part (polyhedron; ball joint) of the rewinding shaft 51B, having the shape of an Allen wrench are formed. For this purpose, in the holes, conoidal spaces that allow the inclination of the rewinding shaft 51B are provided. By forming the junctions in this manner, the rewinding shaft 51B can smoothly rotate.

In the present invention, it is apparent that working modes different in a wide range can be formed on this basis of the present invention without departing from the spirit and scope of the present invention. The present invention is not restricted by any specific embodiment except as may be limited by the appended claims.

What is claimed is:

1. A transmission device of driving-force for a camera including:

an input member for inputting a turning-force;

an output member that is arranged so that its rotation center may be different from a rotation center of said input member;

a drive shaft transmitting turning-force from said input member to said output member, wherein said input member and output member are arranged in the camera with centers fixed at predetermined relative positions so that their axes of rotation are not coaxial; and a junction of said drive shaft and at least one of said input member and said output member rotates in a manner similar to a one-piece structure although having different rotation centers and allowing mutual inclination making it possible to mutually rock.

2. The transmission device of driving-force for a camera according to claim 1, wherein said junction is constructed with a conoidal concave part formed in said input member and a polygonal convex part formed in an end part of said drive shaft.

3. The transmission device of driving-force for a camera according to claim 1, wherein said junction is constructed with a convex part, which is formed in an end part of said drive shaft and has a Phillips screwdriver shape, and a concave part, which is formed in said input member and removably receives in a free and easy manner the convex part of said drive shaft.

4. A transmission device of driving-force for a camera including:

a driving-force switching means selectively switching driving-force from a driving a source to a first or a second input member;

a first output member that is arranged so that its rotation center may be different from that of said first input member and transmits the driving-force to a winding means;

a second output member that is arranged so that its rotation center may be different from that of said second input member and transmits the driving-force to a rewinding means;

a first drive shaft that is rockable with respect to said first input member and said first output member and rotates similar to a one-piece structure with said first input member and said first output member while allowing mutual inclination with respect to said first input and first output members, which have different rotation centers; and a second drive shaft that is rockable with respect to said second input member and said second output member and rotates similar to a one-piece structure with said second input member and said second output member while allowing mutual inclination with respect to said first input and first output members, which have different rotation centers.

5. The transmission device of driving-force for a camera according to claim 4, wherein opposite end parts of at least one of said first and second drive shafts has a polygonal convex part and conoidal concave parts are provided respectively in said input member and said output member that conform to the shape of both end parts.

6. The transmission device of driving-force for a camera according to claim 4, wherein opposite end parts of at least one of said first and second drive shafts has a convex part having a Phillips type screwdriver shape and concave parts that respectively receive the convex part in a free and easy manner.

7. The transmission device of driving-force for a camera according to claim 6, wherein said concave parts have a conoidal shape.

8. A transmission device of driving-force for a camera including:

a first rotary member for providing rotation or receiving rotation;

a second rotary member receiving the rotation of said first rotary member or providing rotation thereto;

a concave part that is provided in one of said first rotary member and said second rotary member and transmits driving-force or receives driving-force; and a convex part that is provided in another one of said first rotary member and said second rotary member for releasable insertion into said concave part, for receiving the driving-force or transmitting the driving-force, wherein said convex part and said concave part are formed so that the rotation of said first and said second rotary members can be transmitted with respective rotation axes of said first and said second rotary members intersecting at a given angle.

9. A transmission device providing a driving-force for a camera including:

an input member for inputting a turning-force;

a first holding member for rotatably supporting said input member at a first fixed position;

an output member outputting a turning-force of said input member;

a second holding member for rotatably supporting said output member at a second fixed position, whereby an axis of rotation of said output member is different from and not coaxial with an axis of rotation of said input member; and a drive shaft for transmitting a turning-force from said input member to said output member;

wherein a junction of said drive shaft and at least one of said input member and said output member rotates in a one-piece manner and have different rotation non-coaxial centers of which intersect and provide mutual inclination therebetween thereby making it possible to mutually rock.

10. A transmission device of driving-force for a camera according to claim 9, wherein, as to said junction, said drive shaft is joined to said input member or said output member so as to be able to move forward or backward in a direction of a thrust applied thereto, and said input member and said output member are held by said first and second holding members, thereby to regulate a position of said drive shaft in the direction of the thrust.

11. The transmission device of claim 1 wherein said drive shaft is held in engagement with said input and output members only by the fixed position of said input and output members and may be easily separated from said input and output members by releasing at least one of the input and output members from their fixed position.

12. The transmission device of claim 1 wherein said input and output members are gears having tapered openings aligned with their axis of rotation for releaseably receiving an associated end of said drive shaft, the ends of said drive shafts being maintained in driving engagement with said input and output members merely by maintaining the fixed positions of the input and output members.

* * * * *

UNITED STATES PATENT AND TRADEMARK OFFICE
CERTIFICATE OF CORRECTION

PATENT NO : 6.106,164
DATED : August 22, 2000
INVENTOR(S): Moriya Katagiri

It is certified that error appears in the above-identified patent and that said Letters Patent are hereby corrected as shown below:

At column 7, line 34, after the word "they" insert therefor --have--.
At column 7, line 64, delete the word "extend" and insert therefor --extends--.

Signed and Sealed this

First Day of May, 2001

Attest:

NICHOLAS P. GODICI

Attesting Officer    Acting Director of the United States Patent and Trademark Office